US012649825B2

(12) United States Patent
Tanji et al.

(10) Patent No.: US 12,649,825 B2
(45) Date of Patent: Jun. 9, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Yutaka Tanji, Tokyo (JP); Tsuyoshi Kato, Tokyo (JP); Daisuke Yagyu, Tokyo (JP); Naoya Fukumoto, Tokyo (JP); Ayano Asano, Tokyo (JP); Natsumi Yoshimura, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/715,260

(22) PCT Filed: Dec. 8, 2022

(86) PCT No.: PCT/JP2022/045229

§ 371 (c)(1), (2) Date: May 31, 2024

(87) PCT Pub. No.: WO2023/112813

PCT Pub. Date: Jun. 22, 2023

(65) Prior Publication Data

US 2025/0129208 A1 Apr. 24, 2025

(30) Foreign Application Priority Data

Dec. 15, 2021 (JP) ................................ 2021-203034

(51) Int. Cl.

| | |
|---|---|
| ***C10M 107/38*** | (2006.01) |
| ***C08G 65/24*** | (2006.01) |

(Continued)

(52) U.S. Cl.

CPC ......... *C08G 65/24* (2013.01); *C08G 65/2618* (2013.01); *C10M 107/38* (2013.01);

(Continued)

(58) Field of Classification Search

CPC ......................... C10M 105/54; C10M 105/56; C10M 105/72; C10M 107/38; C10M 2211/0425;

(Continued)

(56) References Cited

U.S. PATENT DOCUMENTS

| | | | | |
|---|---|---|---|---|
| 2016/0260452 A1 | 9/2016 | Pathem | | |
| 2020/0263104 A1* | 8/2020 | Yamaguchi | .......... | G11B 5/7257 |
| 2023/0120626 A1* | 4/2023 | Fukumoto | ............ | C10M 107/38 428/833 |

FOREIGN PATENT DOCUMENTS

| | | |
|---|---|---|
| WO | 2017/145995 A1 | 8/2017 |
| WO | 2018/116742 A1 | 6/2018 |

(Continued)

*Primary Examiner* — Holly Rickman
*Assistant Examiner* — Linda N Chau
(74) *Attorney, Agent, or Firm* — Sughrue Mion, PLLC

(57) ABSTRACT

A fluorine-containing ether compound is provided which is represented by the following formula: $R^1—R^2—CH_2—R^{3a}—CH_2—R^{4a}—CH_2—R^{3b}—CH_2—R^{4b}—CH_2—R^{3c}—CH_2—R^5—R^6$ ($R^{3a}$, $R^{3b}$, and $R^{3c}$ are perfluoropolyether chains; $R^2$, $R^{4a}$, $R^{4b}$, and $R^5$ are a divalent linking group having at least one selected from the group consisting of a hydroxyl group, an amino group, a carboxy group, and a sulfo group; $R^2$ has an oxygen atom at an end that is bonded to $R^1$; $R^5$ has an oxygen atom at an end that is bonded to $R^6$; $R^1$ and $R^6$ are an organic group having 1 to 50 carbon atoms or a hydrogen atom, and at least one of them is a group in which a cyano group is bonded to a carbon atom of an organic group having 1 to 8 carbon atoms).

15 Claims, 1 Drawing Sheet

(51) Int. Cl.
*C08G 65/26* (2006.01)
*G11B 5/725* (2006.01)
*C10N 20/04* (2006.01)
*C10N 40/18* (2006.01)

(52) U.S. Cl.
CPC ........ *G11B 5/7257* (2020.08); *C08G 2650/48* (2013.01); *C10M 2213/0606* (2013.01); *C10N 2020/04* (2013.01); *C10N 2040/18* (2013.01)

(58) Field of Classification Search
CPC .......... C10M 2211/06; C10M 2213/06; C10M 2213/0606; C10M 2213/043; C10M 2215/16; C10M 2219/102; C10N 2020/04; C10N 2030/06; C10N 2040/18; C10N 2050/023; C10N 2050/025; G11B 5/725; G11B 5/7253; G11B 5/7257
See application file for complete search history.

(56) References Cited

FOREIGN PATENT DOCUMENTS

| | | | |
|---|---|---|---|
| WO | 2019/039200 | A1 | 2/2019 |
| WO | 2019/054148 | A1 | 3/2019 |
| WO | 2021/131961 | A1 | 7/2021 |

* cited by examiner

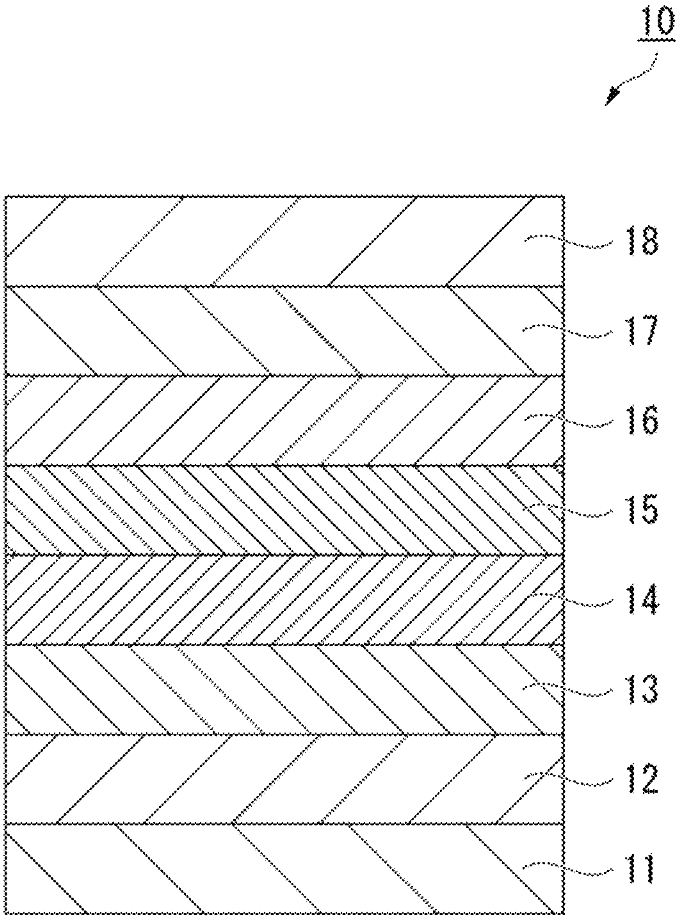
10
18
17
16
15
14
13
12
11

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This application is a National Stage of International Application No. PCT/JP2022/045229 filed Dec. 8, 2022, claiming priority from Japanese Patent Application No. 2021-203034, filed Dec. 15, 2021, the content of which is incorporated herein by reference.

BACKGROUND ART

The development of magnetic recording media suitable for high recording densities has progressed in order to improve the recording densities of magnetic recording and reproducing devices.

In the related art, there is a magnetic recording medium in which a recording layer is formed on a substrate and a protective layer made of carbon or the like is formed on the recording layer. The protective layer protects information recorded in the recording layer and enhances the slidability of a magnetic head. However, sufficient durability of the magnetic recording medium cannot be obtained by simply providing the protective layer on the recording layer. Therefore, generally, a lubricant is applied to the surface of the protective layer to form a lubricating layer.

As a lubricant when the lubricating layer of the magnetic recording medium is formed, for example, a lubricant containing a compound having a polar group such as a hydroxyl group or an amino group at an end of a fluorine-based polymer having a repeating structure containing $—CF_2—$ has been proposed.

For example, Patent Document 1, Patent Document 2, and Patent Document 3 disclose a fluorine-containing ether compound having a framework in which three perfluoropolyether chains are bonded via a linking group having one or more polar groups, and end groups having a polar group are bonded to both sides via a methylene group ($—CH_2—$).

In addition, Patent Document 4 and Patent Document 5 disclose a fluorine-containing ether compound in which a divalent linking group having a polar group is bonded to both ends of a perfluoropolyether chain and an end group that is an organic group having a cyano group is bonded to at least one thereof.

In addition, Patent Document 6 discloses a fluorine-containing ether compound in which a perfluoropolyether chain, a methylene group ($—CH_2—$), and a divalent linking group having a polar group are bonded in that order to both sides of an aliphatic hydrocarbon chain having a hydroxyl group, and an end group that is an organic group having a cyano group is bonded to at least one thereof.

CITATION LIST

Patent Documents

[Patent Document 1]
PCT International Publication No. WO2018/116742

[Patent Document 2]
PCT International Publication No. WO2017/145995

[Patent Document 3]
U.S. Patent Application Publication No. 2016/0260452

[Patent Document 4]
PCT International Publication No. WO2019/039200

[Patent Document 5]
PCT International Publication No. WO2019/054148

[Patent Document 6]
PCT International Publication No. WO2021/131961

SUMMARY OF INVENTION

Technical Problem

There is a demand for a further decrease in a floating height of a magnetic head in magnetic recording and reproducing devices. This requires a further decrease in the thickness of a lubricating layer in magnetic recording media.

However, generally, even if the thickness of the lubricating layer is reduced, the corrosion resistance of the magnetic recording medium tends to decrease. In addition, when a thin lubricating layer is formed, projections that reduce the floating stability of a magnetic head are likely to be formed. Accordingly, there is a demand for a lubricating layer that has a strong effect of inhibiting corrosion of the magnetic recording medium and that improves floating stability of a magnetic head even if the thickness is thin.

The present invention has been made in view of the above circumstances, and an object of the present invention is to provide a fluorine-containing ether compound that can be used as a material for a lubricant for a magnetic recording medium that can form a lubricating layer that has a strong effect of inhibiting corrosion of the magnetic recording medium and that improves floating stability of a magnetic head even if the thickness is thin.

In addition, an object of the present invention is to provide a lubricant for a magnetic recording medium which contains the fluorine-containing ether compound of the present invention and can form a lubricating layer that has a strong effect of inhibiting corrosion of the magnetic recording medium and that improves floating stability of a magnetic head even if the thickness is thin.

In addition, an object of the present invention is to provide a magnetic recording medium which has a lubricating layer that contains the fluorine-containing ether compound of the present invention, improves floating stability of a magnetic head, and has excellent corrosion resistance.

Solution to Problem

The present invention includes the following aspects.

A first aspect of the present invention provides the following fluorine-containing ether compound.

[1] A fluorine-containing ether compound represented by the following Formula (1):

$$R^1—R^2—CH_2—R^{3a}—CH_2—R^{4a}—CH_2—R^{3b}—CH_2—R^4—CH_2—R^{3c}—CH_2—R^5—R^6 \quad (1)$$

(in Formula (1), $R^{3a}$, $R^{3b}$, and $R^{3c}$ are perfluoropolyether chains; some or all of $R^{3a}$, $R^{3b}$, and $R^{3c}$ may be the same or all of them may be different from each other; $R^2$, $R^{4a}$, $R^{4b}$, and $R^5$ are divalent linking groups having at least one polar group selected from the group consisting of a hydroxyl group, an amino group, a carboxy group, and a sulfo group; some or all of $R^2$, $R^{4a}$, $R^{4b}$, and $R^5$ may be the same or all of them may be different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom located at an end of $R^2$ or $R^5$, and may be the same as or different from each other; and $R^1$ and $R^6$ are an organic group having 1 to 50 carbon atoms or a hydrogen atom, and at least one of them is a group in which a cyano group is bonded to a carbon atom of an organic group having 1 to 8 carbon atoms).

The fluorine-containing ether compound of the first aspect of the present invention preferably has characteristics described in [2] to [12] below. It is also preferable to arbitrarily combine two or more characteristics described in [2] to [12] below.

[2] The fluorine-containing ether compound according to [1], wherein, in Formula (1), at least one of $R^1$ and $R^6$ is a group in which a cyano group is bonded to a carbon atom constituting a phenyl group or an alkyl group having 1 to 6 carbon atoms.

[3] The fluorine-containing ether compound according to [1] or [2], wherein, in Formula (1), $R^2$, $R^{4a}$, $R^{4b}$, and $R^5$ each have one or more hydroxyl groups.

[4] The fluorine-containing ether compound according to [3], wherein a total number of hydroxyl groups in $R^2$ and hydroxyl groups in $R^5$ in Formula (1) is 2 to 6.

[5] The fluorine-containing ether compound according to any one of [1] to [4], wherein, in Formula (1), both $R^1$ and $R^6$ are a group in which a cyano group is bonded to a carbon atom constituting a phenyl group or an alkyl group having 1 to 6 carbon atoms.

[6] The fluorine-containing ether compound according to any one of [1] to [5], wherein, in Formula (1), $R^2$, $R^{4a}$, $R^{4b}$, and $R^5$ are each independently a linking group represented by the following Formula (2):

(2)

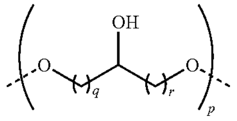

(in Formula (2), p represents an integer of 1 to 3; p q's each independently represent an integer of 1 to 4, and p r's each independently represent an integer of 1 to 4; an oxygen atom on the leftmost side in Formula (2) is disposed on the side opposite to $R^{3b}$ in Formula (1); and an oxygen atom on the rightmost side in Formula (2) is disposed on the side of $R^{3b}$ in Formula (1)).

[7] The fluorine-containing ether compound according to any one of [1] to [6], wherein, in Formula (1), $R^2$ and $R^5$ are each independently a linking group represented by the following Formula (3-1) or (3-2):

(3-1)

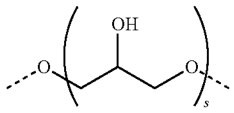

-continued (3-2)

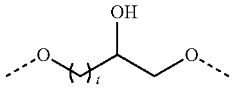

(in Formula (3-1), s represents an integer of 1 to 3; and in Formula (3-1), an oxygen atom on the leftmost side is bonded to $R^1$ or $R^6$, and an oxygen atom on the rightmost side is bonded to $CH_2$ adjacent to $R^{3a}$ or $R^{3c}$)

(in Formula (3-2), t represents an integer of 2 to 4; and in Formula (3-2), an oxygen atom on the left side is bonded to $R^1$ or $R^6$, and an oxygen atom on the right side is bonded to $CH_2$ adjacent to $R^{3a}$ or $R^{3c}$).

[8] The fluorine-containing ether compound according to any one of [1] to [7], wherein, in Formula (1), $R^{4a}$ and $R^{4b}$ are each independently a linking group represented by the following Formula (3-1) or (3-3):

(3-1)

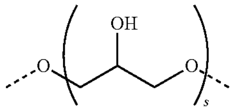

(3-3)

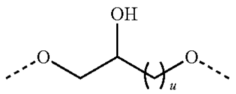

(in Formula (3-1), s represents an integer of 1 to 3; and in Formula (3-1), an oxygen atom on the leftmost side is bonded to $CH_2$ adjacent to $R^{3a}$ or $R^{3c}$, and an oxygen atom on the rightmost side is bonded to $CH_2$ adjacent to $R^{3b}$)

(in Formula (3-3), u represents an integer of 2 to 4; and in Formula (3-3), an oxygen atom on the left side is bonded to $CH_2$ adjacent to $R^{3a}$ or $R^{3c}$, and an oxygen atom on the right side is bonded to $CH_2$ adjacent to $R^{3b}$).

[9] The fluorine-containing ether compound according to any one of [1] to [8], wherein, in Formula (1), $R^{3a}$ and $R^{3c}$ are the same, $R^{4a}$ and $R^{4b}$ are the same, and $R^1$—$R^2$— and $R^6$—$R^5$— are the same.

[10] The fluorine-containing ether compound according to any one of [1] to [9], wherein, in Formula (1), $R^{3a}$, $R^{3b}$, and $R^{3c}$ are each independently a perfluoropolyether chain represented by the following Formula (4):

$$—(CF_2)_{w1}—O—(CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (4)$$

(in Formula (4), w2, w3, w4, and w5 indicate an average degree of polymerization, and each independently represent 0 to 20, provided that all of w2, w3, w4, and w5 are not 0 at the same time; w1 and w6 are average values indicating the number of $CF_2$'s, and each independently represent 1 to 3; and the arrangement sequence of repeating units in Formula (4) is not particularly limited).

[11] The fluorine-containing ether compound according to any one of [1] to [10], wherein, in Formula (1), $R^{3a}$, $R^{3b}$, and $R^{3c}$ are each independently any one selected from among perfluoropolyether chains represented by the following Formulae (4-1) to (4-4):

$$—CF_2—(OCF_2CF_2)_h—(OCF_2)_i—OCF_2— \quad (4\text{-}1)$$

(in Formula (4-1), h and i indicate an average degree of polymerization, h represents 1 to 20, and i represents 0 to 20)

$$—CF_2CF_2—(OCF_2CF_2CF_2)_j—OCF_2CF_2— \quad (4\text{-}2)$$

(in Formula (4-2), j indicates an average degree of polymerization, and represents 1 to 15)

$$—CF_2CF_2CF_2—(OCF_2CF_2CF_2CF_2)_k—OCF_2CF_2CF_2— \quad (4\text{-}3)$$

(in Formula (4-3), k indicates an average degree of polymerization, and represents 1 to 10)

$$—(CF_2)_{w7}—O—(CF_2CF_2CF_2O)_{w8}—(CF_2CF_2O)_{w9}—(CF_2)_{w10}— \quad (4\text{-}4)$$

(in Formula (4-4), w8 and w9 indicate an average degree of polymerization, and each independently represent 1 to 20; and w7 and w10 are average values indicating the number of $CF_2$'s, and each independently represent 1 to 2).

[12] The fluorine-containing ether compound according to any one of [1] to [11], which has a number-average molecular weight in a range of 400 to 10,000.

A second aspect of the present invention provides the following lubricant for a magnetic recording medium.

[13] A lubricant for a magnetic recording medium including the fluorine-containing ether compound according to any one of [1] to [12].

A third aspect of the present invention provides the following magnetic recording medium.

[14] A magnetic recording medium in which at least a magnetic layer, a protective layer, and a lubricating layer are sequentially provided on a substrate, wherein the lubricating layer contains the fluorine-containing ether compound according to any one of [1] to [12].

[15] The magnetic recording medium according to [14], wherein the lubricating layer has an average film thickness of 0.5 nm to 2.0 nm.

Advantageous Effects of Invention

The fluorine-containing ether compound of the present invention is the compound represented by Formula (1). Therefore, the fluorine-containing ether compound of the present invention can be suitably used as a material for a lubricant for a magnetic recording medium.

Since the lubricant for a magnetic recording medium of the present invention contains the fluorine-containing ether compound of the present invention, even if the thickness is thin, it is possible to form a lubricating layer that has a strong effect of inhibiting corrosion of the magnetic recording medium and that provides good floating stability of a magnetic head.

The magnetic recording medium of the present invention has a lubricating layer that contains the fluorine-containing ether compound of the present invention and that has a strong effect of inhibiting corrosion of the magnetic recording medium and that improves floating stability of a magnetic head. Therefore, the magnetic recording medium of the present invention achieves good floating stability of a magnetic head and has excellent reliability and durability. In addition, since the magnetic recording medium of the present invention has a lubricating layer that improves floating stability of a magnetic head and that has a strong effect of inhibiting corrosion, it is possible to reduce the thickness of the protective layer and/or the lubricating layer.

BRIEF DESCRIPTION OF DRAWINGS

The FIGURE is a schematic cross-sectional view showing one embodiment of a magnetic recording medium of the present invention.

DESCRIPTION OF EMBODIMENTS

In order to address the above problems, the inventors conducted extensive studies as follows.

In the related art, a fluorine-containing ether compound having a polar group such as a hydroxyl group at an end of a chain structure has been used as a material for a lubricant for a magnetic recording medium (hereinafter abbreviated as a "lubricant" in some cases) applied to the surface of the protective layer. The polar groups in the fluorine-containing ether compound are bonded to the active sites on the protective layer to improve adhesion of the lubricating layer with respect to the protective layer. Therefore, a fluorine-containing ether compound having polar groups not only at the ends of the chain structure but also within the chain structure is suitably used as the material for the lubricant.

However, when a thin lubricating layer is formed on the protective layer using a conventional lubricant, it is difficult to realize a lubricating layer that has a strong effect of inhibiting corrosion of the magnetic recording medium and that provides good floating stability of a magnetic head. Therefore, when a lubricating layer is formed using a conventional lubricant, in order to form a lubricating layer that has a strong effect of inhibiting corrosion of the magnetic recording medium and that provides good floating stability of a magnetic head, it is necessary to increase the film thickness of the lubricating layer.

The main reason why a thin lubricating layer formed using a conventional lubricant has an insufficient effect of inhibiting corrosion of the magnetic recording medium and insufficient floating stability of a magnetic head is speculated to be that, because the lubricant contained in the lubricating layer is bulky, the coating state of the lubricating layer with respect to the protective layer becomes non-uniform.

Thus, the inventors conducted extensive studies with a focus on binding between the polar groups in the fluorine-containing ether compound contained in the lubricant and the active sites on the protective layer in order to realize a lubricant that can form a lubricating layer with a uniform coating state with respect to the protective layer even if the thickness is thin.

As a result, it was found that a fluorine-containing ether compound could be used in which a perfluoropolyether chain is disposed in the center of a chain structure, a divalent linking group having a polar group, a perfluoropolyether chain, and a divalent linking group having a polar group are bonded to both ends in that order via a methylene group ($—CH_2—$), an end group that is an organic group having 1 to 50 carbon atoms or a hydrogen atom is bonded to both ends, and at least one end group is a group in which a cyano group is bonded to a carbon atom of an organic group having 1 to 8 carbon atoms.

In such a fluorine-containing ether compound, as shown in <1> to <3> below, interaction between the polar group of the divalent linking group and the protective layer is less likely to be inhibited, and each polar group of the divalent linking group independently exhibits favorable interaction with the protective layer. Moreover, in the fluorine-containing ether compound, as shown in <4> below, the cyano group contained in at least one end group and the polar group of the divalent linking group each can be independently bonded to a plurality of functional groups (active sites) present on the protective layer. Therefore, the lubricating layer containing the fluorine-containing ether compound has excellent adhesion to the protective layer because polar groups that are not bonded to a plurality of functional groups (active sites) present on the protective layer are less likely to be formed. Therefore, it is speculated that the lubricant containing the fluorine-containing ether compound can form a lubricating layer having a uniform coating state with respect to the protective layer even if the thickness is thin, and a lubricating layer that has a strong effect of inhibiting corrosion of the magnetic recording medium and that improves floating stability of a magnetic head is obtained.

<1> In the fluorine-containing ether compound, at least one end group contains a cyano group (—CN). It is difficult for the bond of the carbon atom constituting the cyano group contained in the end group and the carbon atom adjacent to the carbon atom constituting the cyano group to rotate freely. Therefore, interaction between the cyano group contained in at least one end group and the polar group of the divalent linking group in the fluorine-containing ether compound adjacent to the end group containing a cyano group is difficult. Therefore, the cyano group contained in at least one end group in the fluorine-containing ether compound and the polar group of the divalent linking group adjacent to the end group containing a cyano group have a very low ability to inhibit each other's interaction with the protective layer.

<2> In the fluorine-containing ether compound, the distance between the divalent linking groups having a polar group, which are disposed between two end groups and a perfluoropolyether chain, and the divalent linking group having a polar group, which is adjacent to the divalent linking groups with a perfluoropolyether chain therebetween, is appropriate. Therefore, it is difficult for the polar group of the divalent linking groups, which are disposed between two end groups and a perfluoropolyether chain, to interact with the polar group of the divalent linking group which is located adjacent to the divalent linking groups with a perfluoropolyether chain therebetween. Accordingly, the interaction of the polar group of the divalent linking groups which are disposed between two end groups and a perfluoropolyether chain with the protective layer is less likely to be inhibited by the polar group of the divalent linking group which is located adjacent to the divalent linking groups a perfluoropolyether chain therebetween.

<3> In the fluorine-containing ether compound, a divalent linking group having a polar group is respectively disposed between the perfluoropolyether chain disposed in the center of the chain structure and two perfluoropolyether chains disposed on the side of the end group. The distance between these two divalent linking groups becomes appropriate due to the perfluoropolyether chain disposed in the center of the chain structure. In addition, the distance between these two divalent linking groups and each of divalent linking groups having a polar group which are located adjacent to the two divalent linking groups via a perfluoropolyether chain therebetween disposed on the side of the end group becomes appropriate, due to the two perfluoropolyether chains disposed on the side of the end group. Therefore, the interaction of the polar groups of two divalent linking groups, which are adjacent to the perfluoropolyether chain disposed in the center of the chain structure, with the protective layer is less likely to be inhibited.

As shown in the above <1> to <3>, binding of the polar groups of the divalent linking groups in the fluorine-containing ether compound to the active sites on the protective layer is less likely to be inhibited by the cyano group contained in at least one end group or the polar groups of the other divalent linking groups, and thus the polar groups each independently exhibit a favorable interaction with the protective layer.

<4> Among a plurality of functional groups (active sites) present on the protective layer, there are positively charged sites and negatively charged sites. Generally, in the fluorine-containing ether compound, a hydroxyl group (—OH), an amino group ($—NH_2$), a carboxy group (—COOH), a sulfo group ($—SO_3H$), and the like used as polar groups exhibit an adsorption ability when hydrogen atoms interact with negatively charged sites on the protective layer via hydrogen bonds. On the other hand, in the cyano group contained in at least one end group in the fluorine-containing ether compound, nitrogen atoms are negatively charged. Therefore, the cyano group in the fluorine-containing ether compound exhibits an adsorption ability according to interaction with the positively charged sites on the protective layer. Accordingly, the polar group and the cyano group contained in the fluorine-containing ether compound are adsorbed to different sites on the protective layer. Therefore, the cyano group contained in at least one end group in the fluorine-containing ether compound and the polar group of the divalent linking group can be each independently bonded to functional groups (active sites) on the protective layer.

Accordingly, in the fluorine-containing ether compound, the cyano group contained in at least one end group and the polar group of the divalent linking group do not inhibit binding with the active sites on the protective layer with each other, but are likely to be involved in binding with the active sites on the protective layer. Moreover, in the fluorine-containing ether compound, the cyano group contained in at least one end group and the polar group of the divalent linking group are each independently bonded to positively charged sites or negatively charged sites (active sites) on the protective layer. Therefore, in the lubricant containing the fluorine-containing ether compound, polar groups that do not bond to the active sites on the protective layer are less likely to occur, and the number of polar groups that are not involved in binding with the active sites on the protective layer is minimized. As a result, it is speculated that the lubricant containing the fluorine-containing ether compound is unlikely to be bulky, and can form a lubricating layer having excellent adhesion to the protective layer and a uniform coating state with respect to the protective layer even if the thickness is thin.

In addition, in the fluorine-containing ether compound, since the distance between the divalent linking groups having a polar group is appropriate, the polar groups contained in the fluorine-containing ether compound are less likely to aggregate with each other. In addition, both ends of three perfluoropolyether chains contained in the fluorine-containing ether compound are brought into close contact with the protective layer by the polar group of the divalent linking group. Therefore, the fluorine-containing ether compound applied onto the protective layer easily wets and spreads on the protective layer and is less likely to be bulky in the lubricating layer. Therefore, the lubricant containing the fluorine-containing ether compound can form a lubricating layer having favorable adhesion to the protective layer and having a uniform coating state with respect to the protective layer even if the thickness is thin.

It is speculated that the lubricant containing the fluorine-containing ether compound can form a lubricating layer having a uniform coating state with respect to the protective layer even if the thickness is thin due to the synergistic effect obtained based on the molecular structure of the above fluorine-containing ether compound, and a lubricating layer that has a strong effect of inhibiting corrosion of the magnetic recording medium and that improves floating stability of a magnetic head is obtained.

In addition, the inventors confirmed that, a thin lubricating layer having a thickness of 9.0 Å to 9.5 Å can be formed on the protective layer using the lubricant containing the fluorine-containing ether compound, the effect of inhibiting corrosion of the magnetic recording medium is strong and the floating stability of a magnetic head is favorable, and completed the present invention.

Hereinafter, preferable examples of a fluorine-containing ether compound, a lubricant for a magnetic recording medium, and a magnetic recording medium of the present invention will be described in detail. Here, the present invention is not limited to the following embodiments. In the present invention, numbers, amounts, positions, ratios, materials, configurations, and the like can be added, omitted, substituted, and changed without departing from the gist and scope of the present invention.

[Fluorine-Containing Ether Compound]

A fluorine-containing ether compound of the present embodiment is represented by the following Formula (1):

$$R^1—R^2—CH_2—R^{1a}—CH_2—R^{4a}—CH_2—R^{1b}—CH_2—R^{4b}—CH_2—R^{3c}—CH_2—R^5—R^6 \quad (1)$$

(in Formula (1), $R^{3a}$, $R^{3b}$, and $R^{3c}$ are perfluoropolyether chains; some or all of $R^{3a}$, $R^{3b}$, and $R^{3c}$ may be the same or all of them may be different from each other; $R^2$, $R^{4a}$, $R^{4b}$, and $R^5$ are divalent linking groups having at least one polar group selected from the group consisting of a hydroxyl group, an amino group, a carboxy group, and a sulfo group; some or all of $R^2$, $R^{4a}$, $R^{4b}$, and $R^5$ may be the same or all of them may be different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom located at an end of $R^2$ or $R^5$, and may be the same as or different from each other; and $R^1$ and $R^6$ are an organic group having 1 to 50 carbon atoms or a hydrogen atom, and at least one of them is a group in which a cyano group is bonded to a carbon atom of an organic group having 1 to 8 carbon atoms).

In the fluorine-containing ether compound of the present embodiment, as shown in Formula (1), a perfluoropolyether chain (hereinafter referred to as a "PFPE chain" in some cases) represented by $R^{3b}$ is disposed in the center of the chain structure. At both ends of the PFPE chain represented by $R^{3b}$, a divalent linking group having a polar group represented by $R^{4a}$ and $R^{4b}$, a PFPE chain represented by $R^{3a}$ and $R^{3c}$, and a divalent linking group having a polar group represented by $R^2$ and $R^5$ are bonded in that order via a methylene group (—$CH_2$—). In the fluorine-containing ether compound represented by Formula (1), end groups represented by $R^1$ and $R^6$, which are an organic group having 1 to 50 carbon atoms or a hydrogen atom, are bonded to both ends. At least one of the end groups represented by $R^1$ and $R^6$ is a group in which a cyano group is bonded to a carbon atom of an organic group having 1 to 8 carbon atoms (hereinafter referred to as an "end group having a cyano group" in some cases).

(PFPE Chains Represented by $R^{3a}$, $R^{3b}$, and $R^{3c}$)

In the fluorine-containing ether compound represented by Formula (1), $R^{3a}$, $R^{3b}$, and $R^{3c}$ are perfluoropolyether chains. When a lubricant containing the fluorine-containing ether compound of the present embodiment is applied to a protective layer to form a lubricating layer, the PFPE chains represented by $R^{3a}$, $R^{3b}$, and $R^{3c}$ cover the surface of the protective layer, impart lubricity to the lubricating layer, and reduce a frictional force between the magnetic head and the protective layer. The PFPE chains represented by $R^{3a}$, $R^{3b}$, and $R^{3c}$ are appropriately selected depending on the performance required for the lubricant containing the fluorine-containing ether compound.

Some or all of $R^{3a}$, $R^{3b}$, and $R^{3c}$ may be the same or all of them may be different from each other. Among $R^{3a}$, $R^{3b}$, and $R^{3c}$, it is preferable that $R^{3a}$ and $R^{3c}$ be the same, and it is more preferable that all of $R^{3a}$, $R^{3b}$, and $R^{3c}$ be the same. This is because the coating state of the fluorine-containing ether compound with respect to the protective layer becomes more uniform and a lubricating layer having better adhesion is obtained.

In this specification, a case in which "PFPE chain is the same" includes a case in which the repeating units of the PFPE chain have the same structure and the average degrees of polymerization are different.

The fluorine-containing ether compound represented by Formula (1) has three PFPE chains ($R^{3a}$, $R^{3b}$, and $R^{3c}$) bonded via a divalent linking group having a polar group represented by $R^{4a}$ and $R^{4b}$ and a methylene group (—$CH_2$—). Therefore, for example, compared to a fluorine-containing ether compound in which the number of PFPE chains bonded via a divalent linking group having a polar group and a methylene group (—$CH_2$—) is 2 or less, the number of divalent linking groups having a polar group that bring the PFPE chain into close contact with the protective layer is larger. Therefore, the fluorine-containing ether compound represented by Formula (1) can form a lubricating layer having favorable adhesion to the protective layer compared to when the number of PFPE chains is 2 or less.

Examples of PFPE chains represented by $R^{3a}$, $R^{3b}$, and $R^{3c}$ include those composed of perfluoroalkylene oxide polymers or copolymers. Examples of perfluoroalkylene oxides include perfluoromethylene oxide, perfluoroethylene oxide, perfluoro-n-propylene oxide, and perfluorobutylene oxide.

In Formula (1), $R^{3a}$, $R^{3b}$, and $R^{3c}$ are each independently preferably a PFPE chain represented by the following Formula (4) derived from a perfluoroalkylene oxide polymer or copolymer:

$$—(CF_2)_{w1}—O—(CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (4)$$

(in Formula (4), w2, w3, w4, and w5 indicate an average degree of polymerization, and each independently represent 0 to 20, provided that all of w2, w3, w4, and w5 are not 0 at the same time; w1 and w6 are average values indicating the number of $CF_2$'s, and each independently represent 1 to 3; and the arrangement sequence of repeating units in Formula (4) is not particularly limited).

In Formula (4), w2, w3, w4, and w5 indicate an average degree of polymerization, and each independently represent 0 to 20, and are preferably 0 to 15 and more preferably 0 to 10. All of w2, w3, w4, and w5 in Formula (4) are not 0 at the same time.

In Formula (4), w1 and w6 are average values indicating the number of $CF_2$'s and each independently represent 1 to 3. Here, w1 and w6 are determined according to the structure of repeating units disposed at the ends of the chain structure in the PFPE chain represented by Formula (4).

$(CF_2O)$, $(CF_2CF_2O)$, $(CF_2CF_2CF_2O)$, and $(CF_2CF_2CF_2CF_2O)$ in Formula (4) are repeating units. The arrangement sequence of repeating units in Formula (4) is not particularly limited. In addition, the number of types of repeating units in Formula (4) is not particularly limited.

It is more preferable that the PFPE chains represented by $R^{3a}$, $R^{3b}$, and $R^{3c}$ be each independently any one selected from among PFPE chains represented by the following Formulae (4-1) to (4-4).

When $R^{3a}$, $R^{3b}$, and $R^{3c}$ are each independently any one selected from among PFPE chains represented by Formulae (4-1) to (4-4), a fluorine-containing ether compound that allows a lubricating layer having favorable lubricity to be obtained is obtained. In addition, when $R^{3a}$, $R^{3b}$, and $R^{3c}$ are each independently any one selected from among PFPE chains represented by Formulae (4-1) to (4-4), the ratio of the number of oxygen atoms (the number of ether bonds (—O—)) to the number of carbon atoms in the PFPE chain becomes appropriate. Therefore, a fluorine-containing ether compound having an appropriate hardness is obtained. Therefore, the fluorine-containing ether compound applied onto the protective layer is less likely to aggregate on the protective layer, and a thinner lubricating layer can be formed with a sufficient coating rate. In addition, since the fluorine-containing ether compound has appropriate flexibility, a lubricating layer having better floating stability of a magnetic head can be formed.

$$CF_2-(OCF_2CF_2)_h-(OCF_2)_i-OCF_2- \quad (4\text{-}1)$$

(in Formula (4-1), h and i indicate an average degree of polymerization, h represents 1 to 20, and i represents 0 to 20)

$$-CF_2CF_2-(OCF_2CF_2CF_2)_j-OCF_2CF_2- \quad (4\text{-}2)$$

(in Formula (4-2), j indicates an average degree of polymerization, and represents 1 to 15)

$$-CF_2CF_2CF_2-(OCF_2CF_2CF_2CF_2)_k-OCF_2CF_2CF_2- \quad (4\text{-}3)$$

(in Formula (4-3), k indicates an average degree of polymerization, and represents 1 to 10)

$$-(CF_2)_{w7}-O-(CF_2CF_2CF_2O)_{w8}-(CF_2CF_2O)_{w9}-(CF_2)_{w10}- \quad (4\text{-}4)$$

(in Formula (4-4), w8 and w9 indicate an average degree of polymerization, and each independently represent 1 to 20; and w7 and w10 are average values indicating the number of $CF_2$'s, and each independently represent 1 to 2).

In Formula (4-1), the arrangement sequence of repeating units $(OCF_2CF_2)$ and $(OCF_2)$ is not particularly limited. In Formula (4-1), the number h of $(OCF_2CF_2)$'s and the number i of $(OCF_2)$'s may be the same as or different from each other. The PFPE chain represented by Formula (4-1) may be a polymer of $(OCF_2CF_2)$ (in other words, i in Formula (4-1) is 0). In addition, the PFPE chain represented by Formula (4-1) may be any of a random copolymer, a block copolymer, and an alternating copolymer composed of $(OCF_2CF_2)$ and $(OCF_2)$.

In Formulae (4-1) to (4-3), when h indicating an average degree of polymerization is 1 to 20, i is 0 to 20, j is 1 to 15, and k is 1 to 10, a fluorine-containing ether compound that allows a lubricating layer having favorable lubricity to be obtained is obtained. In addition, in Formulae (4-1) to (4-3), when h and i indicating an average degree of polymerization is 20 or less, j is 15 or less, and k is 10 or less, this is preferable because the viscosity of the fluorine-containing ether compound does not become too high, and a lubricant containing this is easily applied. Here, h, i, j, and k indicating an average degree of polymerization are preferably 1 to 10, more preferably 1.5 to 8, and still more preferably 2 to 7, because a fluorine-containing ether compound is obtained which provides a lubricating layer which easily wets and spreads on the protective layer and has a uniform film thickness.

In Formula (4-4), the arrangement sequence of repeating units $(CF_2CF_2CF_2O)$ and $(CF_2CF_2O)$ is not particularly limited. In Formula (4-4), the number w8 of $(CF_2CF_2CF_2O)$'s and the number w9 of $(CF_2CF_2O)$'s which indicate an average degree of polymerization may be the same as or different from each other. Formula (4-4) may contain any of a random copolymer, a block copolymer, and an alternating copolymer composed of monomer units $(CF_2CF_2CF_2O)$ and $(CF_2CF_2O)$.

In Formula (4-4), w8 and w9 indicating an average degree of polymerization each independently represent 1 to 20, are preferably 1 to 15, and more preferably 1 to 10.

In Formula (4-4), w7 and w10 are average values indicating the number of $CF_2$'s, and each independently represent 1 to 2. Here, w7 and w10 are determined according to the structure of repeating units disposed at the ends of the chain structure in the PFPE chain represented by Formula (4-4).

(Divalent Linking Groups Represented by $R^{4a}$ and $R^{4b}$)

In the fluorine-containing ether compound represented by Formula (1), $R^{4a}$ and $R^{4b}$ are a divalent linking group having at least one polar group selected from the group consisting of a hydroxyl group, an amino group, a carboxy group, and a sulfo group (hereinafter simply referred to as a "polar group" in some cases). $R^{4a}$ is disposed between the PFPE chain represented by $R^{3a}$ and the PFPE chain represented by $R^{3b}$. $R^{4b}$ is disposed between the PFPE chain represented by $R^{3h}$ and the PFPE chain represented by $R^{3c}$. Therefore, $R^{4a}$ and $R^{4b}$ bring the fluorine-containing ether compound into close contact with the protective layer. As a result, the lubricant containing the fluorine-containing ether compound of the present embodiment can form a thin lubricating layer with a sufficient coating rate.

In Formula (1), $R^{4a}$ and $R^{4b}$ may be the same as or may be different from each other. When $R^{4a}$ and $R^{4b}$ are the same, the coating state of the fluorine-containing ether compound with respect to the protective layer becomes more uniform, and a lubricating layer having better adhesion can be formed. In addition, when $R^{4a}$ and $R^{4b}$ are the same, a fluorine-containing ether compound can be easily and efficiently produced.

In this specification, "$R^{4a}$ and $R^{4b}$ are the same" means that the atom contained in $R^{4a}$ and the atom contained in $R^{4b}$ are disposed symmetrically with respect to $R^{3b}$ disposed in the center of the fluorine-containing ether compound represented by Formula (1).

It is preferable that an oxygen atom be disposed at both ends of the divalent linking groups represented by $R^{4a}$ and $R^{4b}$. The oxygen atoms disposed at both ends of the divalent linking groups represented by $R^{4a}$ and $R^{4b}$ form an ether bond (—O—) with methylene groups (—$CH_2$—) disposed on both sides of $R^{4a}$ and $R^{4b}$. These ether bonds impart appropriate flexibility to the fluorine-containing ether compound represented by Formula (1) and increase the affinity between the polar group of the divalent linking groups represented by $R^{4a}$ and $R^{4b}$ and the protective layer.

The divalent linking groups represented by $R^{4a}$ and $R^{4b}$ are each preferably a group in which one or more polar groups are bonded to a carbon atom of an alkylene group having 3 to 6 carbon atoms and oxygen atoms are bonded to both ends. The alkylene group having 3 to 6 carbon atoms is preferably an alkylene group having 3 to 4 carbon atoms. The alkylene group having 3 to 6 carbon atoms preferably has a linear structure. Particularly, $R^{4a}$ and $R^{4b}$ are preferably groups in which a polar group is bonded to a carbon atom disposed near the center of a linear alkylene group having 3 to 6 carbon atoms and oxygen atoms are bonded to both ends. This is because the coating state of the fluorine-containing ether compound with respect to the protective layer becomes more uniform and a lubricating layer having better adhesion is obtained.

The polar groups of $R^{4a}$ and $R^{4b}$ are at least one selected from the group consisting of a hydroxyl group (—OH), an amino group (—$NH_2$), a carboxy group (—COOH), and a sulfo group (—$SO_3H$). Among these, particularly, the polar group is preferably a hydroxyl group. That is, $R^{4a}$ and $R^{4b}$ each preferably have one or more hydroxyl groups. The hydroxyl group has a large interaction with the protective layer, particularly the protective layer formed of a carbon-based material. Therefore, in the case of a fluorine-containing ether compound in which $R^{4a}$ and $R^{4b}$ each have one or more hydroxyl groups, a lubricating layer containing this has higher adhesion to the protective layer. In the present embodiment, it is more preferable that all the polar groups of $R^{4a}$ and $R^{4b}$ be hydroxyl groups.

$R^{4a}$ and $R^{4b}$ are each independently preferably a linking group represented by the following Formula (2):

(2)

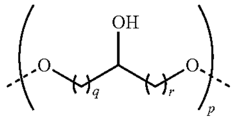

(in Formula (2), p represents an integer of 1 to 3; p q's each independently represent an integer of 1 to 4, and p r's each independently represent an integer of 1 to 4; an oxygen atom on the leftmost side in Formula (2) is disposed on the side opposite to $R^{3b}$ in Formula (1); and an oxygen atom on the rightmost side in Formula (2) is disposed on the side of $R^{3b}$ in Formula (1)).

In Formula (2), p represents an integer of 1 to 3, and is preferably 1 or 2 and more preferably 1. When p in Formula (2) is 2 or 3, combinations of q and r in a plurality of repeating units (—$(CH_2)_q$—CH(OH)—$(CH_2)_r$—O—) may be the same as or different from each other.

In Formula (2), p q's each independently represent an integer of 1 to 4, and are preferably 1 or 2 and more preferably 1. An oxygen atom on the leftmost side in Formula (2) is disposed on the side opposite to $R^{3b}$ in Formula (1). That is, an oxygen atom on the leftmost side in Formula (2) is positioned on the molecular end side (the $R^1$ or $R^6$ side) of $R^{4a}$ or $R^{4b}$ with $R^{3b}$ as a center.

In Formula (2), p r's each independently represent an integer of 1 to 4, are preferably 1 or 2, and more preferably 1. An oxygen atom on the rightmost side in Formula (2) is disposed on the side of $R^{3b}$ in Formula (1). That is, an oxygen atom on the rightmost side in Formula (2) is positioned on the side of the molecule center (the side of $R^{3b}$) of $R^{4a}$ or $R^{4b}$ with $R^{3b}$ as a center.

In the linking group represented by Formula (2), at least one of q and r in the repeating unit (—$(CH_2)_q$—CH(OH)—$(CH_2)_r$—O—) is preferably 1.

Specifically, $R^{4a}$ and $R^{4b}$ are each independently preferably a linking group represented by the following Formula (3-1) or (3-3). In Formula (3-1), an oxygen atom on the leftmost side is bonded to $CH_2$ adjacent to $R^{3a}$ or $R^{3c}$, and an oxygen atom on the rightmost side is bonded to $CH_2$ adjacent to $R^{3b}$. In addition, in Formula (3-3), an oxygen atom on the left side is bonded to $CH_2$ adjacent to $R^{3a}$ or $R^{3c}$, and an oxygen atom on the right side is bonded to $CH_2$ adjacent to $R^{3b}$.

When $R^{4a}$ and $R^{4b}$ are a linking group represented by Formula (3-1) or (3-3), this is preferable because it is easy to synthesize the fluorine-containing ether compound represented by Formula (1).

(3-1)

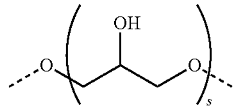

(3-3)

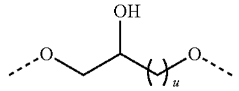

(in Formula (3-1), s represents an integer of 1 to 3; and in Formula (3-1), an oxygen atom on the leftmost side is bonded to $CH_2$ adjacent to $R^{3a}$ or $R^{3c}$, and an oxygen atom on the rightmost side is bonded to $CH_2$ adjacent to $R^{3b}$)

(in Formula (3-3), u represents an integer of 2 to 4; and in Formula (3-3), an oxygen atom on the left side is bonded to $CH_2$ adjacent to $R^{3a}$ or $R^{3c}$, and an oxygen atom on the right side is bonded to $CH_2$ adjacent to $R^{3b}$)

In Formula (3-1), s represents an integer of 1 to 3, and is preferably 1 or 2 and more preferably 1. When $R^{4a}$ and $R^{4b}$ are Formula (3-1) and s is 1, this is preferable because the fluorine-containing ether compound represented by Formula (1) is more easily synthesized. In addition, when $R^{4a}$ and $R^{4b}$ are a linking group represented by Formula (3-1) and s is 1, since the fluorine-containing ether compound has a glycerin structure having excellent flexibility, the fluorine-containing ether compound allows a lubricating layer having a strong adsorption force with respect to the protective layer and better floating stability of a magnetic head to be formed.

The linking group represented by Formula (3-3) has a structure in which 1 to 3 methylene groups are added to a glycerin framework (—$OCH_2CH(OH)CH_2O$—). Therefore, the lubricating layer containing the fluorine-containing ether compound in which $R^{4a}$ and $R^{4b}$ are Formula (3-3) has better hydrophobicity compared to when u in Formula (3-3) is 1. As a result, the lubricating layer can effectively prevent intrusion of water, which causes corrosion of the magnetic recording medium, and has a strong effect of inhibiting corrosion of the magnetic recording medium.

In Formula (3-3), u represents an integer of 2 to 4, is preferably an integer of 2 to 3, and more preferably 2. This is because the fluorine-containing ether compound represented by Formula (1) has a structure having excellent flexibility so that the coating state of the fluorine-containing ether compound with respect to the protective layer becomes more uniform and a lubricating layer having better adhesion is obtained.

(Divalent Linking Group Having Polar Group Represented by $R^2$ and $R^5$)

In the fluorine-containing ether compound represented by Formula (1), $R^2$ and $R^5$ are a divalent linking group having at least one polar group selected from the group consisting of a hydroxyl group, an amino group, a carboxy group, and a sulfo group. $R^2$ has an oxygen atom at an end that is bonded to $R^1$, and is bonded to $R^1$ via an ether bond when $R^1$ is an organic group. $R^5$ has an oxygen atom at an end that is bonded to $R^6$, and is bonded to $R^6$ via an ether bond when $R^6$ is an organic group. When $R^1$ is a hydrogen atom, the oxygen atom at the end of $R^2$ and $R^1$ form a hydroxyl group, and when $R^6$ is a hydrogen atom, the oxygen atom at the end of $R^5$ and $R^6$ form a hydroxyl group.

In the fluorine-containing ether compound represented by Formula (1), some or all of $R^2$, $R^{4a}$, $R^{4b}$, and $R^5$ may be the same or all of them may be different from each other. Therefore, $R^2$ and $R^5$ may be the same as or different from each other. When $R^2$ and $R^5$ are the same, the coating state of the fluorine-containing ether compound with respect to the protective layer becomes more uniform, and a lubricating layer having better adhesion can be formed.

In this specification, "$R^2$ and $R^5$ are the same" means that the atoms contained in $R^2$ and the atoms contained in $R^5$ are disposed symmetrically with respect to the framework ($—R^{3a}—CH_2—R^{4a}—CH_2—R^{3b}—CH_2—R^{4b}—CH_2—R^{3c}—$) disposed in the center of the fluorine-containing ether compound represented by Formula (1).

In the fluorine-containing ether compound represented by Formula (1), since $R^2$ and $R^5$ each have one or more polar groups, when a lubricating layer is formed on the protective layer using the lubricant containing this, favorable interaction occurs between the lubricating layer and the protective layer. $R^2$ and $R^5$ can be appropriately selected depending on the performance required for the lubricant containing the fluorine-containing ether compound.

The polar groups in $R^2$ and $R^5$ are at least one selected from the group consisting of a hydroxyl group ($—OH$), an amino group ($—NH_2$), a carboxy group ($—COOH$), and a sulfo group ($—SO_3H$). Among these, particularly, the polar group is preferably a hydroxyl group. That is, $R^2$ and $R^5$ each preferably have one or more hydroxyl groups. The hydroxyl group has a large interaction with the protective layer, particularly the protective layer formed of a carbon-based material. Therefore, when $R^2$ and $R^5$ each have one or more hydroxyl groups, the lubricating layer containing the fluorine-containing ether compound has better adhesion to the protective layer. In the present embodiment, it is more preferable that all the polar groups in $R^2$ and $R^5$ be hydroxyl groups.

When the polar group of $R^2$ and/or $R^5$ contains a hydroxyl group, the total number of hydroxyl groups contained in $R^2$ and hydroxyl groups contained in $R^5$ in Formula (1) is preferably 2 to 6, more preferably 2 to 5, and most preferably 2 to 4. When the total number of hydroxyl groups is 2 or more, interaction between the hydroxyl group of $R^2$ and/or $R^5$ and the protective layer is more effectively obtained. As a result, a fluorine-containing ether compound that can form a lubricating layer having high adhesion to the protective layer is obtained. In addition, when the total number of hydroxyl groups is 6 or less, the number of polar groups that are not involved in binding between the lubricating layer and the active sites on the protective layer decreases. Therefore, it is possible to prevent polar groups that are not involved in binding between the lubricating layer and the active sites on the protective layer from aggregating to form projections, and colliding with a magnetic head. Accordingly, a lubricating layer having better floating stability can be formed. In addition, when the total number of hydroxyl groups is 4 or less, the lubricating layer containing the fluorine-containing ether compound has sufficiently high hydrophobicity. Therefore, it is possible to prevent water, which causes corrosion of the magnetic recording medium, from being attracted into the lubricating layer. Accordingly, it is possible to form a lubricating layer that can more effectively minimize contamination and corrosion of the magnetic recording medium.

Preferably, the divalent linking group represented by $R^2$ has an oxygen atom at an end that is bonded to $R^1$ and also has an oxygen atom disposed at the other end (end that is bonded to $CH_2$ adjacent to $R^2$). In addition, preferably, the divalent linking group represented by $R^5$ has an oxygen atom at an end that is bonded to $R^6$ and also has an oxygen atom disposed at the other end (end that is bonded to $CH_2$ adjacent to $R^5$). Oxygen atoms disposed at both ends of the divalent linking groups represented by $R^2$ and $R^5$ form an ether bond ($—O—$) with atoms bonded on both sides of $R^2$ and $R^5$ when $R^1$ and $R^6$ are an organic group having 1 to 50 carbon atoms. These ether bonds impart appropriate flexibility to the fluorine-containing ether compound represented by Formula (1), and increase the affinity between the polar group of the divalent linking group represented by $R^2$ and $R^5$ and the protective layer.

The divalent linking groups represented by $R^2$ and $R^5$ are each preferably a group in which one or more polar groups are bonded to a carbon atom of an alkylene group having 3 to 8 carbon atoms and oxygen atoms are bonded to both ends. An alkylene group having 3 to 8 carbon atoms is preferably an alkylene group having 3 to 5 carbon atoms. An alkylene group having 3 to 8 carbon atoms preferably has a linear structure. This is because the coating state of the fluorine-containing ether compound with respect to the protective layer becomes more uniform, and a lubricating layer having better adhesion can be formed.

Similarly to $R^{4a}$ and $R^{4b}$, $R^2$ and $R^5$ are each independently preferably a linking group represented by the following Formula (2):

(2)

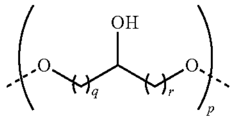

(in Formula (2), p represents an integer of 1 to 3; p q's each independently represent an integer of 1 to 4, and p r's each independently represent an integer of 1 to 4; an oxygen atom on the leftmost side in Formula (2) is disposed on the side opposite to $R^{3b}$ in Formula (1); and an oxygen atom on the rightmost side in Formula (2) is disposed on the side of $R^{3b}$ in Formula (1)).

Similarly to $R^{4a}$ and $R^{4b}$, when $R^2$ and $R^5$ are linking groups represented by Formula (2), in Formula (2), p represents an integer of 1 to 3, and is preferably 1 or 2 and more preferably 1. When p in Formula (2) is 2 or 3, combinations of q and r in a plurality of repeating units ($—(CH_2)_q—CH(OH)—(CH_2)_r—O—$) may be the same as or different from each other.

In Formula (2), p q's each independently represent an integer of 1 to 4, and are preferably 1 or 2 and more preferably 1. An oxygen atom on the leftmost side in Formula (2) is disposed on the side opposite to $R^{3b}$ in Formula (1). That is, when $R^2$ and $R^5$ are a linking group represented by Formula (2), an oxygen atom on the leftmost side in Formula (2) is positioned on the molecular end side (the $R^1$ or $R^6$ side) of $R^2$ or $R^5$ with $R^{3b}$ as a center.

In Formula (2), p r's each independently represent an integer of 1 to 4, are preferably 1 or 2, and more preferably 1. An oxygen atom on the rightmost side in Formula (2) is disposed on the side of $R^{3b}$ in Formula (1). That is, when $R^2$ and $R^5$ are a linking group represented by Formula (2), an oxygen atom on the rightmost side in Formula (2) is positioned on the side of the molecule center (the side of $R^{3b}$) of $R^2$ or $R^5$ with $R^{3b}$ as a center.

In the linking group represented by Formula (2), at least one of q and r in the repeating unit ($-(CH_2)_q-CH(OH)-(CH_2)_r-O-$) is preferably 1.

Specifically, $R^2$ and $R^5$ are each independently preferably a linking group represented by the following Formula (3-1) or (3-2). In Formula (3-1), an oxygen atom on the leftmost side is bonded to $R^1$ or $R^6$, and an oxygen atom on the rightmost side is bonded to $CH_2$ adjacent to $R^{3a}$ or $R^{3c}$. In addition, in Formula (3-2), an oxygen atom on the left side is bonded to $R^1$ or $R^6$, and an oxygen atom on the right side is bonded to $CH_2$ adjacent to $R^{3a}$ or $R^{3c}$.

(3-1)

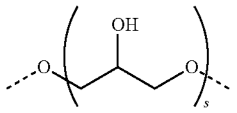

(3-2)

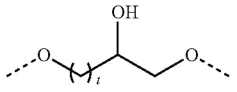

(in Formula (3-1), s represents an integer of 1 to 3; and in Formula (3-1), an oxygen atom on the leftmost side is bonded to $R^1$ or $R^6$, and an oxygen atom on the rightmost side is bonded to $CH_2$ adjacent to $R^{3a}$ or $R^{3c}$)

(in Formula (3-2), t represents an integer of 2 to 4; and in Formula (3-2), an oxygen atom on the left side is bonded to $R^1$ or $R^6$, and an oxygen atom on the right side is bonded to $CH_2$ adjacent to $R^{3a}$ or $R^{3c}$.

When $R^2$ and $R^5$ are a linking group represented by Formula (3-1) or (3-2), this is preferable because it is easy to synthesize the fluorine-containing ether compound represented by Formula (1). In addition, when $R^2$ and $R^5$ are a linking group represented by Formula (3-1) or (3-2), if $R^1$ and $R^6$ are an organic group, $R^2$ and $R^1$, and $R^5$ and $R^6$ form an ether bond. In addition, an ether bond is disposed between $R^2$ and $CH_2$ adjacent to $R^2$, and between $R^5$ and $CH_2$ adjacent to $R^5$. As a result, the fluorine-containing ether compound has appropriate flexibility and can form a lubricating layer having better corrosion resistance and floating stability.

All of the linking groups represented by Formulae (3-1) and (3-2) have a hydroxyl group that has a particularly strong interaction with the protective layer among the polar groups. In addition, in the linking groups represented by Formulae (3-1) and (3-2), methylene groups ($-CH_2-$) are disposed on both sides of a carbon atom to which the hydroxyl group is bonded. Therefore, when $R^2$ and $R^5$ are a linking group represented by Formula (3-1) or (3-2), for the following reasons, the fluorine-containing ether compound can form a lubricating layer having better adhesion to the protective layer.

That is, in the linking groups represented by Formulae (3-1) and (3-2), at least the methylene group and the oxygen atom ($-O-$) at the end of $R^2$ or $R^5$ are disposed between the carbon atom to which the hydroxyl group is bonded, and $R^1$ or $R^6$. Therefore, the distance between the hydroxyl group contained in the linking groups represented by Formulae (3-1) and (3-2) and the cyano group of $R^1$ and/or $R^6$ is appropriate. In addition, when $R^1$ and $R^6$ are an organic group, the free rotation of the end group is slightly inhibited according to the ether bond connecting $R^1$ and $R^2$, and $R^5$ and $R^6$. Therefore, the cyano group of $R^1$ and/or $R^6$ and the hydroxyl group of the linking groups represented by Formulae (3-1) and (3-2) are unlikely to interact with each other. Therefore, the hydroxyl group of the linking groups represented by Formulae (3-1) and (3-2) and the end group represented by $R^1$ and/or $R^6$ each independently exhibit a favorable interaction with the protective layer, and each are independently likely to be bonded to a plurality of functional groups (active sites) present on the protective layer.

In addition, among a plurality of functional groups (active sites) present on the protective layer, there are positively charged sites and negatively charged sites. The hydroxyl group of the linking groups represented by Formulae (3-1) and (3-2) exhibit an adsorption ability when hydrogen atoms interact with negatively charged sites on the protective layer via hydrogen bonds. On the other hand, since nitrogen atoms are negatively charged, the cyano group of $R^1$ and/or $R^6$ exhibits an adsorption ability according to interaction with the positively charged sites on the protective layer. Therefore, the cyano group of $R^1$ and/or $R^6$ and the hydroxyl group of the linking groups represented by Formulae (3-1) and (3-2) are adsorbed to different sites on the protective layer. Therefore, when $R^2$ and $R^5$ are a linking group represented by Formula (3-1) or (3-2), the cyano group of $R^1$ and/or $R^6$ and the polar group of the divalent linking group represented by $R^2$ and $R^5$ can each independently interact with functional groups (active sites) on the protective layer.

In addition, when $R^2$ and $R^5$ are a linking group represented by Formula (3-1), this is preferable because the fluorine-containing ether compound represented by Formula (1) is more easily synthesized.

In the linking group represented by Formula (3-1), s is an integer of 1 to 3. Since s is 1 or more in the linking group represented by Formula (3-1), when $R^2$ and $R^5$ are a linking group represented by Formula (3-1), one or more hydroxyl groups having a particular, strong interaction with the protective layer are provided as the polar group. As a result, a fluorine-containing ether compound that allows a lubricating layer having better adhesion to the protective layer to be obtained is obtained. In addition, in the linking group represented by Formula (3-1), since s in Formula (3-1) is 3 or less, it is possible to prevent the polarity of the fluorine-containing ether compound from becoming too high, which may be caused due to a large number of hydroxyl groups in the linking group represented by Formula (3-1), and to prevent the occurrence of corrosion of the magnetic recording medium having a lubricating layer containing this.

In addition, in the linking group represented by Formula (3-1), when s in Formula (3-1) is 2 or 3, the distance between the hydroxyl groups contained in the linking group represented by Formula (3-1) is appropriate. As a result, even if the number of hydroxyl groups contained in $R^2$ and/or $R^5$ is plural, the hydroxyl groups contained in $R^2$ and/or $R^5$ are likely to be involved in binding with the active sites on the protective layer.

In the linking group represented by Formula (3-1), s is preferably 1 or 2. In the linking group represented by Formula (3-1), when s is 1, this is more preferable because a fluorine-containing ether compound is more easily synthesized.

The linking group represented by Formula (3-2) has a structure in which 1 to 3 methylene groups are added to a glycerin framework ($—OCH_2CH(OH)CH_2O—$). Therefore, the lubricating layer containing the fluorine-containing ether compound in which $R^2$ and $R^5$ are Formula (3-2) has better hydrophobicity compared to when t in Formula (3-2) is 1. As a result, the lubricating layer can effectively prevent intrusion of water, which causes corrosion of the magnetic recording medium, and has a strong effect of inhibiting corrosion of the magnetic recording medium.

In the linking group represented by Formula (3-2), t is an integer of 2 to 4, preferably an integer of 2 to 3, and more preferably 2. Since t in Formula (3-2) is 2 to 4, the methylene group contained in Formula (3-2) improves the hydrophobicity of the fluorine-containing ether compound, and a stronger corrosion inhibition effect is obtained.

When only one of the end groups represented by $R^1$ and $R^6$ (for example, $R^1$) is an end group having a cyano group and the other end group (for example, $R^6$) that is not an end group having a cyano group is a hydrogen atom, the divalent linking group (for example, $R^5$) that is bonded to the other end group is preferably a linking group represented by Formula (3-2). In this case, the other end group (=hydrogen atom) is bonded to the oxygen atom on the left side in Formula (3-2) to form a hydroxyl group. When the divalent linking group (for example, $R^5$) is a linking group represented by Formula (3-2), the distance between the hydroxyl group formed by bonding a hydrogen atom that is the other end group (for example, $R^6$) and an oxygen atom on the left side in Formula (3-2) and the hydroxyl group contained in the linking group represented by Formula (3-2) is appropriate. As a result, the hydroxyl group formed by bonding $R^5$ or $R^2$ to the hydrogen atom that is the other end group, and the hydroxyl groups contained in $R^5$ or $R^2$ are likely to be involved in binding with the active sites on the protective layer.

In the fluorine-containing ether compound represented by Formula (1), when $R^2$ and $R^5$ are linking groups represented by Formula (3-1) or (3-2), it is more preferable that $R^2$ and $R^5$ be the same because the coating state of the fluorine-containing ether compound with respect to the protective layer becomes more uniform, and a lubricating layer having better adhesion can be formed.

(End Groups Represented by $R^1$ and $R^6$)

In the fluorine-containing ether compound represented by Formula (1), $R^1$ and $R^6$ are an end group that is bonded to an oxygen atom at an end of $R^2$ or $R^5$. The end groups represented by $R^1$ and $R^6$ are each independently an organic group having 1 to 50 carbon atoms or a hydrogen atom. At least one of $R^1$ and $R^6$ is a group in which a cyano group is bonded to a carbon atom of an organic group having 1 to 8 carbon atoms (end group having a cyano group). $R^1$ and $R^6$ may be the same as or different from each other.

In the fluorine-containing ether compound represented by Formula (1), the cyano group contained in the end group having a cyano group exhibits an appropriate interaction with the protective layer. Therefore, the end group having a cyano group has a function of improving the adhesion to the protective layer, and forming a lubricating layer that has a strong effect of inhibiting corrosion of the magnetic recording medium and that improves floating stability of a magnetic head even if the thickness is thin.

In the fluorine-containing ether compound represented by Formula (1), the type of the end group having a cyano group can be appropriately selected depending on the performance and the like required for the lubricant containing the fluorine-containing ether compound.

The number of cyano groups of the end group having a cyano group is not particularly limited, and may be 1 and may be 2 or more. When the number of cyano groups of the end group having a cyano group is 2 or more, this is preferable because a fluorine-containing ether compound can form a lubricating layer having better adhesion to the protective layer. In addition, when the number of cyano groups of the end group having a cyano group is 1, this is preferable because it is relatively easy to produce the fluorine-containing ether compound.

The end group having a cyano group is a group in which a cyano group is bonded to a carbon atom of an organic group having 1 to 8 carbon atoms. In the fluorine-containing ether compound represented by Formula (1), since the organic group has 1 to 8 carbon atoms, the end group having a cyano group is less likely to cause steric hindrance, and a fluorine-containing ether compound having favorable affinity between the cyano group and the protective layer is obtained.

Examples of organic groups in the end group having a cyano group include a phenyl group and an alkyl group having a linear or branched structure and having 1 to 8 carbon atoms, and a phenyl group or an alkyl group having a linear or branched structure and having 1 to 6 carbon atoms is preferable. When the organic group in the end group having a cyano group is a phenyl group or an alkyl group having a linear or branched structure and having 1 to 6 carbon atoms, a fluorine-containing ether compound that more effectively minimizes interaction between the cyano group of $R^1$ and/or $R^6$ and the polar group of the adjacent linking group ($R^2$ or $R^5$) and that has high affinity between the cyano group and the protective layer is obtained.

The organic group in the end group having a cyano group is preferably a hydrocarbon group having 3 or more carbon atoms. In this case, a fluorine-containing ether compound has better hydrophobicity compared to when the organic group is a hydrocarbon group having 2 or fewer carbon atoms. As a result, it is possible to form a lubricating layer that can effectively prevent intrusion of water, which causes corrosion of the magnetic recording medium, and that has a stronger effect of inhibiting corrosion of the magnetic recording medium.

The organic group in the end group having a cyano group is preferably a linear alkyl group. In this case, for example, compared to when the organic group in the end group having a cyano group is a phenyl group or a branched alkyl group, in the lubricating layer containing the fluorine-containing ether compound, the cyano group of $R^1$ and/or $R^6$ easily approaches the protective layer, and the cyano group easily interacts with the active sites on the protective layer. As a result, the fluorine-containing ether compound allows a lubricating layer having a strong adsorption force with respect to the protective layer and better floating stability of a magnetic head to be formed.

In addition, when the organic group in the end group having a cyano group is a branched alkyl group, it is preferable that the alkyl group has a plurality of cyano groups. In this case, even if the organic group in the end group having a cyano group is bulkier than a linear alkyl group, since the number of cyano groups of the end group is large, the active sites on the protective layer easily interact with the cyano groups alkyl.

In addition, the organic group in the end group having a cyano group may have a polar moiety such as a carbonyl group in addition to the cyano group. In this case, even if the organic group in the end group having a cyano group is bulkier than a linear alkyl group, the end group easily approaches the protective layer due to interaction between the polar moiety of the end group and the protective layer, and thus the cyano group of the end group easily interacts with the active sites on the protective layer. As a result, the fluorine-containing ether compound allows a lubricating layer having a strong adsorption force with respect to the protective layer and better floating stability of a magnetic head to be formed.

Examples of end groups having a cyano group include any of organic groups represented by the following Formulae (5-1) to (5-11). The dotted lines in Formulae (5-1) to (5-11) are bonds bonded to $R^2$ or $R^5$ in Formula (1).

The end group having a cyano group in the fluorine-containing ether compound of the present embodiment is not limited to the organic groups represented by Formulae (5-1) to (5-11).

(5-1)

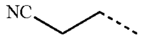

(5-2)

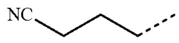

(5-3)

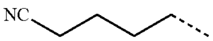

(5-4)

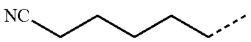

(5-5)

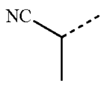

(5-6)

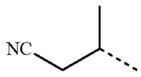

(5-7)

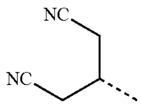

(5-8)

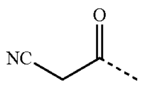

(5-9)

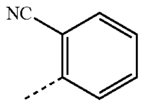

(5-10)

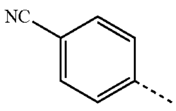

(5-11)

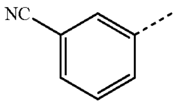

The end groups having a cyano group are preferably end groups represented by Formulae (5-1), (5-2), and (5-6) to (5-11), and more preferably end groups represented by Formulae (5-1), (5-2), and (5-9) to (5-11) among the end groups represented by Formulae (5-1) to (5-11). This is because it is relatively easy to produce the fluorine-containing ether compound.

The end groups represented by Formulae (5-1) to (5-4) have a linear aliphatic nitrile, and, for example, have higher fluidity than the end groups represented by Formulae (5-5) to (5-11). Therefore, even if a part of the lubricating layer containing the fluorine-containing ether compound is deformed due to resistance, the fluorine-containing ether compound in the lubricating layer moves to another location, and projections are formed, the ability to return to its original position again is high. In addition, since the linear aliphatic nitrile has high fluidity, it has a strong ability to interact with the active sites on the protective layer and a strong adsorption force with respect to the protective layer. Accordingly, the fluorine-containing ether compound having end groups represented by Formulae (5-1) to (5-4) can form a lubricating layer having better floating stability of a magnetic head.

In addition, since the end groups represented by Formulae (5-9) to (5-11) have a relatively rigid aromatic nitrile, the movement of molecules is restricted to some extent. Therefore, for example, the fluorine-containing ether compound having the end group represented by Formulae (5-9) to (5-11) has a lower ability of the cyano group of $R^1$ and/or $R^6$, and the polar group of the adjacent linking group ($R^2$ or $R^5$) to inhibit each other's interaction with the protective layer than the fluorine-containing ether compound having the end group represented by Formulae (5-1) to (5-8).

In addition, the aromatic nitrile of the end groups represented by Formulae (5-9) to (5-11) has a phenyl group as an organic group in the end group. Therefore, the lubricating layer containing the fluorine-containing ether compound has favorable hydrophobicity, and can effectively prevent intrusion of water, which causes corrosion of the magnetic recording medium.

Accordingly, the fluorine-containing ether compound having end groups represented by Formulae (5-9) to (5-11) can form a lubricating layer having a stronger effect of inhibiting corrosion of the magnetic recording medium.

In the fluorine-containing ether compound represented by Formula (1), when both the end groups represented by $R^1$ and $R^6$ are end groups having a cyano group, $R^1$ and $R^6$ may be the same as or different from each other. When $R^1$ and $R^6$ are the same, the coating state of the fluorine-containing ether compound with respect to the protective layer becomes more uniform, and a lubricating layer having better adhesion can be formed.

In this specification, "$R^1$ and $R^6$ are the same" means that, with respect to the framework ($—R^{3a}—CH_2—R^{4a}—CH_2—R^{3b}—CH_2—R^{4b}—CH_2—R^{3c}—$) disposed in the center of the fluorine-containing ether compound represented by Formula (1), atoms contained in $R^1$, which is bonded via a methylene group and $R^2$ to the framework, and atoms contained in $R^6$, which is bonded via a methylene group and $R^5$ to the framework, are disposed symmetrically.

In the fluorine-containing ether compound represented by Formula (1), when only one of the end groups represented by $R^1$ and $R^6$ (for example, $R^1$) is an end group having a cyano group, the other end group (for example, $R^6$) that is not an end group having a cyano group may be any group as long as it is an organic group having 1 to 50 carbon atoms or a hydrogen atom, and is not particularly limited.

When one (for example, $R^6$) of the end groups represented by $R^1$ and $R^6$ is a hydrogen atom, the hydrogen atom (for example, $R^6$) as an end group is bonded to an oxygen atom at an end of a divalent linking group having a polar group (for example, $R^5$) to form a hydroxyl group. This hydroxyl group further improves the adhesion between the lubricating layer containing the fluorine-containing ether compound and the protective layer.

The other end group having no cyano group is preferably an organic group having at least one double bond or triple bond, and examples thereof include a group containing an aromatic ring, a group containing an unsaturated heterocycle, a group containing an alkenyl group, and a group containing an alkynyl group. When the other end group is an organic group having at least one double bond or triple bond, the lubricating layer containing the fluorine-containing ether compound has favorable hydrophobicity. As a result, the lubricating layer can effectively prevent intrusion of water, which causes corrosion of the magnetic recording medium, and has a strong effect of inhibiting corrosion of the magnetic recording medium.

When the other end group is an organic group having at least one double bond or triple bond, specific examples thereof include a phenyl group, methoxy phenyl group, fluoride phenyl group, naphthyl group, phenethyl group, methoxyphenethyl group, fluoride phenethyl group, benzyl group, methoxybenzyl group, naphthyl methyl group, methoxynaphthyl group, pyrrolyl group, pyrazolyl group, methylpyrazolyl methyl group, imidazolyl group, furyl group, furfuryl group, oxazolyl group, isoxazolyl group, thienyl group, thienylethyl group, thiazolyl group, methylthiazolylethyl group, isothiazolyl group, pyridyl group, pyrimidinyl group, pyridazinyl group, pyrazinyl group, indolinyl group, benzofuranyl group, benzothienyl group, benzimidazolyl group, benzoxazolyl group, benzothiazolyl group, benzopyrazolyl group, benzoisooxazolyl group, benzisothiazolyl group, quinolyl group, isoquinolyl group, quinazolinyl group, quinoxalinyl group, phthalazinyl group, cinnolinyl group, vinyl group, allyl group, butenyl group, 1-propynyl group, propargyl group (2-propynyl group), butynyl group, methylbutynyl group, pentynyl group, methylpentynyl group, and hexynyl group.

The other end group may be an alkyl group which may have a substituent. The alkyl group preferably has 1 to 8 carbon atoms, more preferably has 1 to 6 carbon atoms, and still more preferably has 1 to 4 carbon atoms. Examples of substituents include an alkoxy group, hydroxyl group, mercapto group, carboxy group, carbonyl group, amino group, and fluoro group.

When the other end group is an alkyl group which may have a substituent, specific examples thereof include a methyl group, ethyl group, propyl group, butyl group, pentyl group, hexyl group, heptyl group, octyl group, trifluoromethyl group, perfluoroethyl group, perfluoropropyl group, perfluorobutyl group, perfluoropentyl group, perfluorohexyl group, octafluoropentyl group, tridecafluorooctyl group, hydroxymethyl group ($—CH_2OH$), hydroxyethyl group ($—CH_2CH_2OH$), hydroxypropyl group ($—CH_2CH_2CH_2OH$), and hydroxybutyl group ($—CH_2CH_2CH_2CH_2OH$).

Among the above examples, the other end group is preferably a hydrogen atom, phenyl group, methoxy phenyl group, naphthyl group, phenethyl group, methoxyphenethyl group, fluorinated phenethyl group, thienylethyl group, allyl group, butenyl group, propargyl group, or hydroxyethyl group; more preferably a hydrogen atom, phenyl group, methoxy phenyl group, naphthyl group, thienylethyl group, allyl group, butenyl group, or hydroxyethyl group; and particularly preferably a methoxy phenyl group or allyl group. In this case, a fluorine-containing ether compound that can form a lubricating layer having better corrosion resistance is obtained.

In the fluorine-containing ether compound represented by Formula (1), the number of hydroxyl groups contained in one molecule is preferably 4 or more, more preferably 5 or more, and still more preferably 6 or more because it is possible to form a lubricating layer that improves adhesion to the protective layer and that achieves better floating stability of a magnetic head. In the fluorine-containing ether compound represented by Formula (1), the number of hydroxyl groups contained in one molecule is preferably 8 or less, more preferably 7 or less, and most preferably 6 or less because it is possible to prevent water, which causes corrosion, from being attracted to the surface of the protective layer due to polarity being too high.

In the fluorine-containing ether compound represented by Formula (1), it is preferable that $R^{3a}$ and $R^{3c}$ be the same, $R^{4a}$ and $R^{4b}$ be the same, and $R^1—R^2—$ and $R^6—R^5—$ be the same in Formula (1). This is because the fluorine-containing ether compound can be easily and efficiently produced. Moreover, in this case, since the fluorine-containing ether compound has a symmetrical structure centered on $R^{3b}$ disposed in the molecule center, it uniformly easily wets and spreads on the protective layer. In addition, it is preferable that all three PFPE chains represented by $R^{3a}$, $R^{3b}$, and $R^{3c}$ in Formula (1) be the same. Thereby, it is easy to identify the synthesized fluorine-containing ether compound, and a fluorine-containing ether compound that can be more easily and efficiently produced is obtained. Particularly, a fluorine-containing ether compound in which $R^{4a}$ and $R^{4b}$ are the linking group represented by Formula (3-1) and s is 1 is more preferable because it can be produced more easily and efficiently.

Specifically, the fluorine-containing ether compound represented by Formula (1) is preferably any of compounds represented by the following Formulae (A) to (V).

When the compound represented by Formula (1) is any of the compounds represented by the following Formulae (A) to (V), a raw material is easily available, and moreover, it is possible to form a lubricating layer that has a strong effect of inhibiting corrosion of the magnetic recording medium and better floating stability of a magnetic head even if the thickness is thin.

In the compounds represented by the following Formulae (A) to (V), $Rf_1$, $Rf_2$, and $Rf_3$ representing PFPE chains have the following structures. That is, in the compounds represented by the following Formulae (A) to (R), (U), and (V), $Rf_1$ is the PFPE chain represented by Formula (4-1). In the compounds represented by the following Formulae (S) and (U), $Rf_2$ is the PFPE chain represented by Formula (4-2). In the compound represented by the following Formula (T), $Rf_3$ is the PFPE chain represented by Formula (4-3). Here, in Formulae (A) to (V), since h and i in $Rf_1$, j in $Rf_2$, and k in $Rf_3$, which represent the PFPE chains, are values indicating an average degree of polymerization, they are not necessarily an integer. Here, h is 1 to 20, and may be, for example, 1 to 10 or 2 to 5. Here, i is 0 to 20, and may be, for example, 1 to 10 or 2 to 5. Here, j is 1 to 15, and may be, for example, 2 to 10 or 3 to 5. Here, k is 1 to 10, and may be, for example, 1 to 8 or 1 to 5.

(4-1)

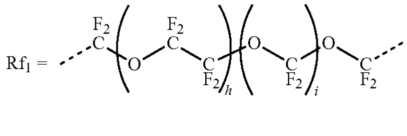

-continued (4-2)

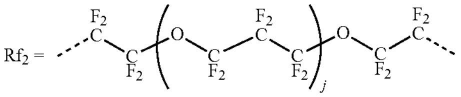

(4-3)

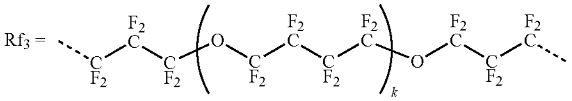

In all compounds represented by the following Formulae (A) to (V), $R^2$ and $R^5$ are the linking group represented by Formula (3-1) or (3-2).

In all compounds represented by the following Formulae (A) to (V), $R^{4a}$ and $R^{4b}$ are the linking group represented by Formula (3-1) or (3-3).

In all compounds represented by the following Formulae (A) to (J) and (S) to (V), $R^{3a}$ and $R^{3c}$ are the same, $R^{4a}$ and $R^{4b}$ are the same, and $R^1$—$R^2$— and $R^6$—$R^5$— are the same.

In the compound represented by the following Formula (A), $R^1$ and $R^6$ in Formula (1) are the end group represented by Formula (5-1). $R^2$, $R^{4a}$, $R^{4b}$, and $R^5$ are the linking group represented by Formula (3-1), and s is 1. $R^{3a}$, $R^{3b}$, and $R^{3'}$ are the PFPE chain represented by Formula (4-1).

In the compound represented by the following Formula (B), $R^1$ and $R^6$ in Formula (1) are the end group represented by Formula (5-1). $R^2$ and $R^5$ are the linking group represented by Formula (3-1), and s is 2. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (C), $R^1$ and $R^6$ in Formula (1) are the end group represented by Formula (5-1). $R^2$ and $R^5$ are the linking group represented by Formula (3-1), and s is 3. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (D), in Formula (1), $R^1$ and $R^6$ are the end group represented by Formula (5-2). In the compound represented by the following Formula (E), $R^1$ and $R^6$ are the end group represented by Formula (5-6). In the compound represented by the following Formula (F), $R^1$ and $R^6$ are the end group represented by Formula (5-7). In the compound represented by the following Formula (G), $R^1$ and $R^6$ in Formula (1) are the end group represented by Formula (5-8). In all compounds represented by the following Formulae (D) to (G), $R^2$, $R^{4a}$, $R^{4b}$, and $R^5$ in Formula (1) are the linking group represented by Formula (3-1), and s is 1. $R^{3a}$, $R^{3b}$, and $R^{3c}$ are the PFPE chain represented by Formula (4-1).

In the compound represented by the following Formula (H), $R^1$ and $R^6$ in Formula (1) are the end group represented by Formula (5-1). $R^2$ and $R^5$ are the linking group represented by Formula (3-2), and t is 2. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (1), $R^1$ and $R^6$ in Formula (1) are the end group represented by Formula (5-9). $R^2$, $R^{4a}$, $R^{4b}$, and $R^5$ are the linking group represented by Formula (3-1), and s is 1. $R^{3a}$, $R^{3b}$, and $R^{3c}$ are the PFPE chain represented by Formula (4-1).

In the compound represented by the following Formula (J), $R^1$ and $R^6$ in Formula (1) are the end group represented by Formula (5-10). $R^2$ and $R^5$ are the linking group represented by Formula (3-1), and s is 2. $R^{4a}$ and $R^{4b}$ are the linking group represented by Formula (3-1), and s is 1. $R^{3a}$, $R^{3b}$, and $R^3$ are the PFPE chain represented by Formula (4-1).

In all compounds represented by the following Formulae (K) to (M), in Formula (1), $R^1$ and $R^6$ are the end group represented by Formula (5-1), and $R^2$ and $R^5$ are the linking group represented by Formula (3-1). In the compound represented by the following Formula (K), s is 1 for $R^2$, and s is 2 for $R^5$. In the compound represented by the following Formula (L), s is 1 for $R^2$, and s is 3 for $R^5$. In the compound represented by the following Formula (M), s is 2 for $R^2$, and s is 3 for $R^5$. In all compounds represented by the following Formulae (K) to (M), $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (N), $R^1$ in Formula (1) is the end group represented by Formula (5-1). $R^6$ is the end group represented by Formula (5-9). $R^2$ is the linking group represented by Formula (3-1), and s is 2. $R^5$ is the linking group represented by Formula (3-1), and s is 1. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (0), $R^1$ in Formula (1) is the end group represented by Formula (5-1). $R^6$ is a 2-hydroxyethyl group. $R^2$ is the linking group represented by Formula (3-1), and s is 2. $R^5$ is the linking group represented by Formula (3-1), and s is 1. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (P), $R^1$ in Formula (1) is the end group represented by Formula (5-1). $R^6$ is an allyl group. $R^2$ is the linking group represented by Formula (3-1), and s is 2. $R^5$ is the linking group represented by Formula (3-1), and s is 1. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (Q), $R^1$ in Formula (1) is the end group represented by Formula (5-1). $R^6$ is a p-methoxyphenyl group. $R^2$ is the linking group represented by Formula (3-1), and s is 2. $R^5$ is the linking group represented by Formula (3-1), and s is 1. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (R), $R^1$ in Formula (1) is the end group represented by Formula (5-1). $R^6$ is a hydrogen atom. $R^2$ is the linking group represented by Formula (3-1), and s is 2. $R^5$ is the linking group represented by Formula (3-2), and t is 2. $R^{4a}$ and $R^{4b}$ are the linking group represented by Formula (3-1), and s is 1. $R^{3a}$, $R^{3b}$, and $R^{3c}$ are the PFPE chain represented by Formula (4-1).

In the compound represented by the following Formula (S), $R^1$ and $R^6$ in Formula (1) are the end group represented by Formula (5-1). $R^2$ and $R^5$ are the linking group represented by Formula (3-1), and s is 2. $R^{4a}$ and $R^{4b}$ are the linking group represented by Formula (3-1), and s is 1. $R^{3a}$, $R^{3b}$, and $R^{3c}$ are the PFPE chain represented by Formula (4-2).

In the compound represented by the following Formula (T), $R^1$ and $R^6$ in Formula (1) are the end group represented by Formula (5-1). $R^2$ and $R^5$ are the linking group represented by Formula (3-1), and s is 2. $R^{4a}$ and $R^{4b}$ are the linking group represented by Formula (3-1), and s is 1. $R^{3a}$, $R^{3b}$, and $R^{3c}$ are the PFPE chain represented by Formula (4-3).

In the compound represented by the following Formula (U), $R^1$ and $R^6$ in Formula (1) are the end group represented by Formula (5-1). $R^2$ and $R^5$ are the linking group represented by Formula (3-1), and s is 2. $R^{4a}$ and $R^{4b}$ are the linking group represented by Formula (3-1), and s is 1. $R^{3a}$ and $R^{3c}$ are the PFPE chain represented by Formula (4-2). $R^{3b}$ is the PFPE chain represented by Formula (4-1).

In the compound represented by the following Formula (V), $R^1$ and $R^6$ in Formula (1) are the end group represented by Formula (5-1). $R^2$ and $R^5$ are the linking group represented by Formula (3-1), and s is 2. $R^{4a}$ and $R^{4b}$ are the linking group represented by Formula (3-3), and u is 2. $R^{3a}$, $R^{3b}$, and $R^{3c}$ are the PFPE chain represented by Formula (4-1).

(A)

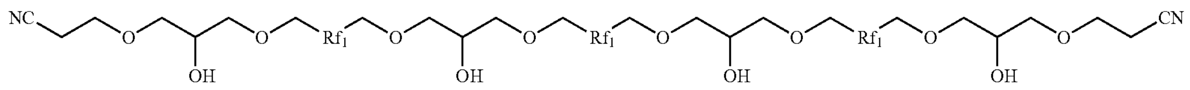

(B)

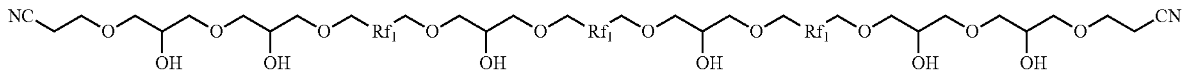

(C)

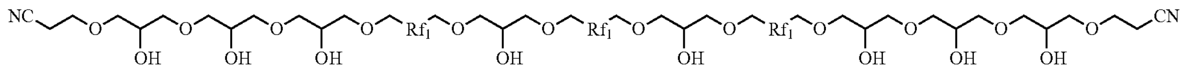

(in Formula (A), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (B), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (C), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(D)

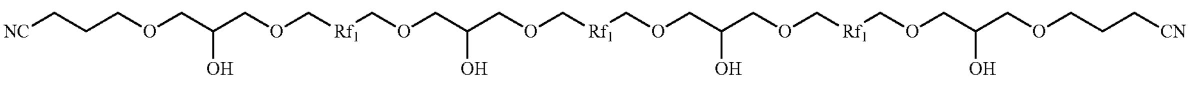

(E)

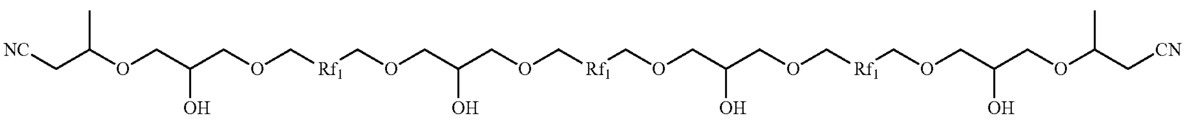

(F)

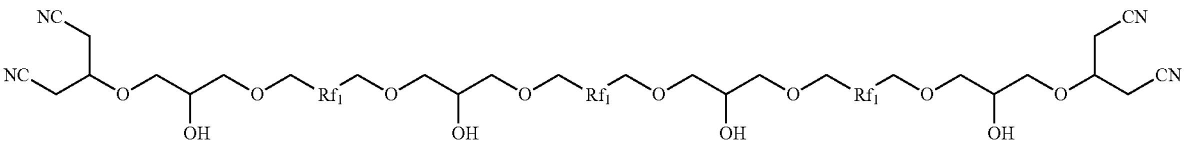

(in Formula (D), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (E), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (F), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(G)

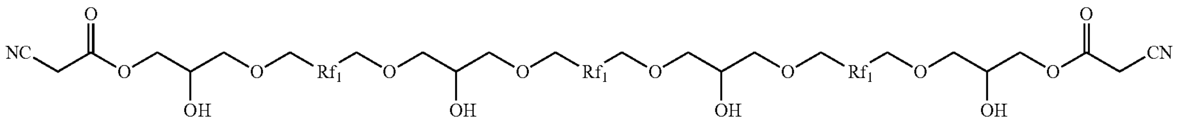

(H)

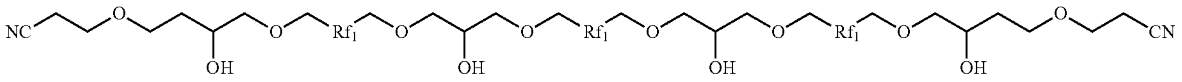

(I)

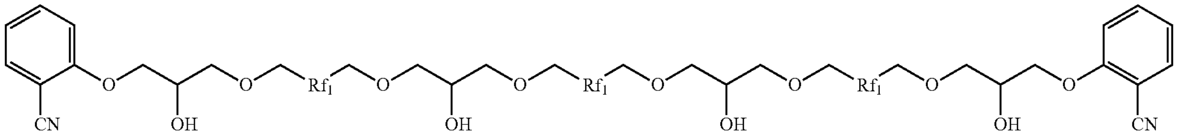

(in Formula (G), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (H), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (I), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(J)

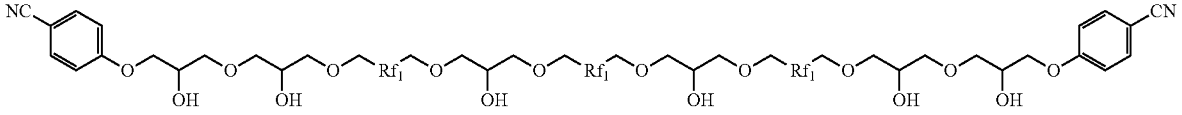

(K)

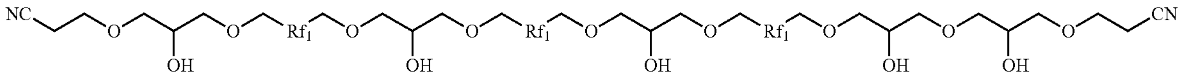

-continued (L)

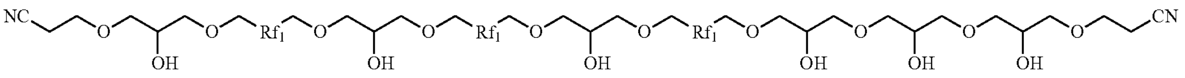

(in Formula (J), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (K), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (L), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(M)

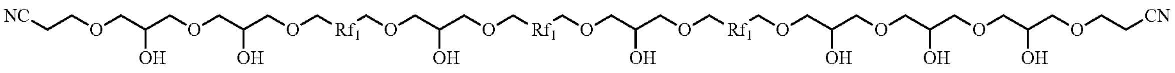

(N)

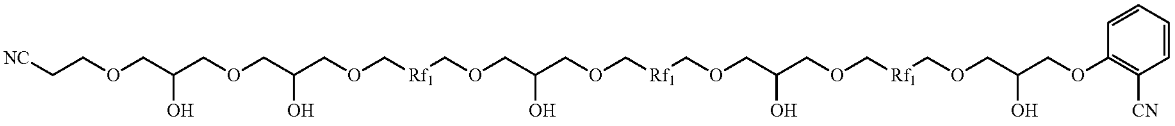

(O)

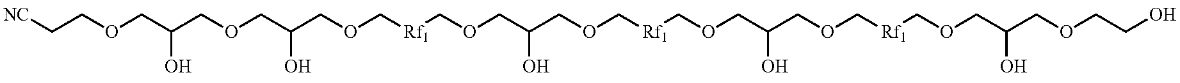

(in Formula (M), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (N), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (O), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(P)

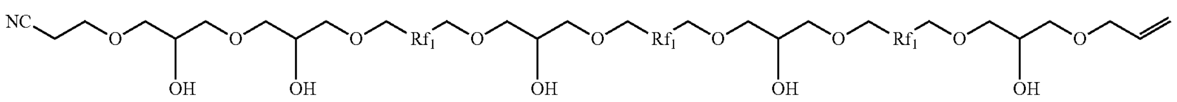

(Q)

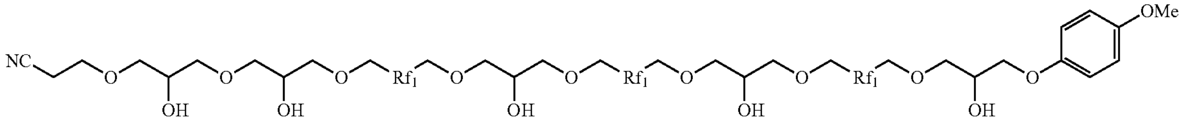

(R)

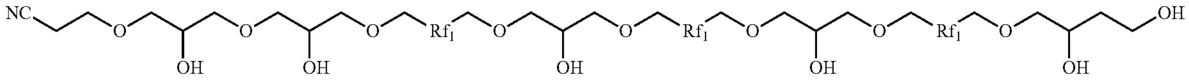

(in Formula (P), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other)

(in Formula (Q), all three $Rf_1$'s are represented by Formula (4-1); in Formula (4-1), h and i indicate an average degree of polymerization, h represents 1 to 20, i represents 0 to 20, and h and i may be the same as or different from each other; in three $Rf_1$'s, some or all of h and i may be the same or all of them may be different from each other; and Me represents a methyl group)

(in Formula (R), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

(S)

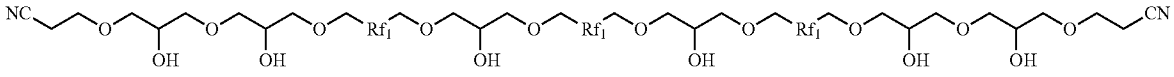

(T)

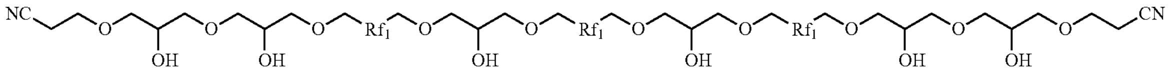

(U)

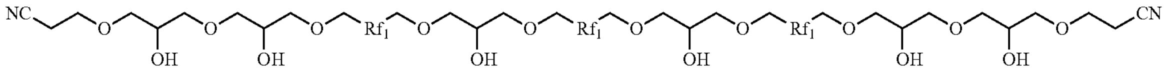

(in Formula (S), all three $Rf_2$'s are represented by Formula (4-2); in Formula (4-2), j indicates an average degree of polymerization and represents 1 to 15; and in three $Rf_2$'s, some or all of j's may be the same as or different from each other)

(in Formula (T), all three $Rf_3$'s are represented by Formula (4-3); in Formula (4-3), k indicates an average degree of polymerization and represents 1 to 10; and in three $Rf_3$'s, some or all of k's may be the same or all of them may be different from each other)

(in Formula (U), all two $Rf_2$'s are represented by Formula (4-2); in Formula (4-2), j indicates an average degree of polymerization and represents 1 to 15; in two $Rf_2$'s, j's may be the same as or different from each other; in Formula (U), $Rf_1$ is represented by Formula (4-1); and in Formula (4-1), h and i indicate an average degree of polymerization, h represents 1 to 20, i represents 0 to 20, and h and i may be the same as or different from each other).

(V)

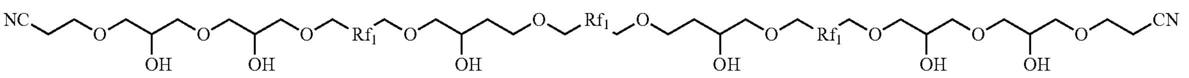

(in Formula (V), all three $Rf_1$'s are represented by Formula (4-1); in Formula (4-1), h and i indicate an average degree of polymerization, h represents 1 to 20, i represents 0 to 20, and h and i may be the same as or different from each other; and in three $Rf_1$'s, some or all of h and i may be the same or all of them may be different from each other).

The number-average molecular weight (Mn) of the fluorine-containing ether compound of the present embodiment is preferably in a range of 400 to 10,000 and particularly preferably in a range of 500 to 5,000. The number-average molecular weight may be 800 to 8,000, 1,000 to 6,000, or 2,000 to 4,000. When the number-average molecular weight is 400 or more, the lubricating layer composed of the lubricant containing the fluorine-containing ether compound of the present embodiment has excellent heat resistance. The number-average molecular weight of the fluorine-containing ether compound is more preferably 500 or more. In addition, when the number-average molecular weight is 10,000 or less, the viscosity of the fluorine-containing ether compound becomes appropriate, and when a lubricant containing this is applied, a lubricating layer having a thin film thickness can be easily formed. The number-average molecular weight of the fluorine-containing ether compound is more preferably 5,000 or less because the viscosity becomes one that makes the lubricant easy to handle.

The number-average molecular weight (Mn) of the fluorine-containing ether compound is a value measured by $^1$H-NMR and $^{19}$F-NMR using AVANCEIII400 (commercially available from Bruker BioSpin). Specifically, the number of repeating units of the PFPE chain is calculated from the integrated value measured by $^{19}$F-NMR to obtain a number-average molecular weight. In the measurement of nuclear magnetic resonance (NMR), a sample is diluted with a hexafluorobenzene/d-acetone(4/1v/v) solvent and measurement is performed. The $^{19}$F-NMR chemical shift reference is −164.7 ppm for the hexafluorobenzene peak, and the $^1$H-NMR chemical shift reference is 2.2 ppm for the acetone peak.

The fluorine-containing ether compound of the present embodiment preferably has a molecular weight dispersity (a ratio of the weight average molecular weight (Mw)/the number-average molecular weight (Mn)) of 1.3 or less which is obtained by molecular weight fractionation by an appropriate method.

In the present embodiment, the method for molecular weight fractionation is not particularly limited, and, for example, molecular weight fractionation using a silica gel column chromatography method, a gel permeation chromatography (GPC) method, or the like, or molecular weight fractionation using a supercritical extraction method or the like can be used.

"Production Method"

The method of producing the fluorine-containing ether compound of the present embodiment is not particularly limited, and conventionally known production methods can be used for production. The fluorine-containing ether compound of the present embodiment can be produced by, for example, the following production methods.

(First Production Method)

When a compound is produced in which, in Formula (1), two PFPE chains represented by $R^{3a}$ and $R^{3c}$ are the same, two linking groups represented by $R^{4a}$ and $R^{4b}$ are the same, and $R^1$—$R^2$— and $R^6$—$R^5$— are the same, the following production method can be used.

First, a fluorine-based compound in which hydroxymethyl groups (—$CH_2OH$) are disposed at both ends of the perfluoropolyether chain corresponding to $R^{3a}$ (=$R^{3c}$) in Formula (1) is prepared. Next, the hydroxyl group of the hydroxymethyl group disposed at one end of the fluorine-based compound is reacted with an epoxy compound having a group that becomes $R^1$—$R^2$—(=a group that becomes $R^6$—$R^5$—) in Formula (1) (first reaction). Therefore, an intermediate compound 1 having a group corresponding to $R^1$—$R^2$—(=a group corresponding to $R^6$—$R^5$—) at one end of the perfluoropolyether chain corresponding to $R^{3a}$ (=$R^{3c}$) is obtained.

As the epoxy compound having a group that becomes $R^1$—$R^2$—(=a group that becomes $R^6$—$R^5$—) in Formula (1), for example, compounds represented by the following Formulae (7-1) to (7-10) can be used. In the following Formulae (7-2), (7-3), and (7-10), THP represents a tetrahydropyranyl group.

When the fluorine-based compound is reacted with the epoxy compound to synthesize the intermediate compound 1, the hydroxyl group of the epoxy compound may be protected using an appropriate protecting group, as in compounds represented by the following Formulae (7-2), (7-3), and (7-10), and the fluorine-based compound may be then reacted.

(7-1)

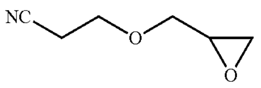

(7-2)

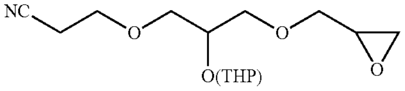

(7-3)

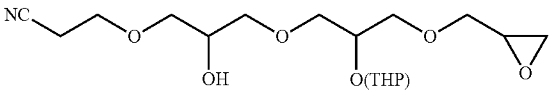

(7-4)

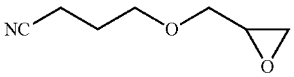

(7-5)

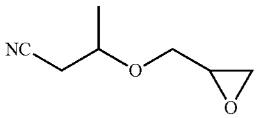

(7-6)

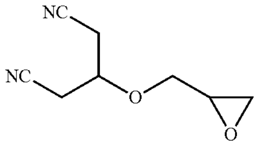

(7-7)

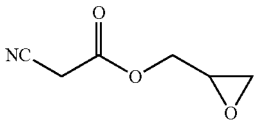

(7-8)

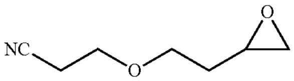

(7-9)

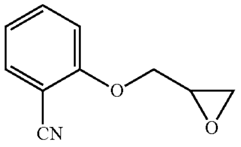

(7-10)

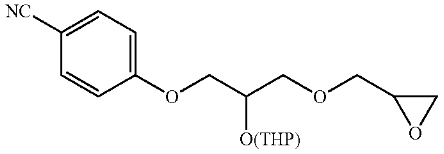

The epoxy compound having a group that becomes $R^1$—$R^2$—(=a group that becomes $R^6$—$R^5$—) in Formula (1) can be produced using the reaction shown in the following Formula (8), for example, when $R^2$ (=$R^5$) is the linking group represented by Formula (3-1) and s is 1.

That is, a method of reacting an alcohol having a structure (R in Formula (8)) corresponding to the end group represented by $R^1$ or $R^6$ in Formula (1) with a halogen compound having an epoxy group corresponding to $R^2$ or $R^5$ such as epibromohydrin can be used for production.

(8)

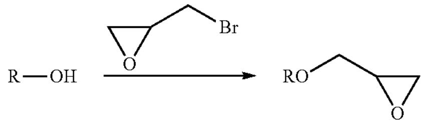

(in Formula (8), R represents a structure corresponding to the end group represented by $R^1$ or $R^6$ in Formula (1)).

In addition, the epoxy compound can be produced using the reaction shown in the following Formula (9), for example, when $R^2$ (=$R^5$) is the linking group represented by Formula (3-1) and s is 2.

That is, an alcohol having a structure (R in Formula (9)) corresponding to the end group represented by $R^1$ or $R^6$ in Formula (1) and allyl glycidyl ether are subjected to an addition reaction to synthesize a compound having a hydroxyl group and R in Formula (9). Then, a method of oxidizing the double bond of the compound having a hydroxyl group and R in Formula (9) by the action of m-chloroperbenzoic acid (mCPBA) can be used for production. Before the double bond of the compound having a hydroxyl group and R in Formula (9) is oxidized by the action of m-chloroperbenzoic acid (mCPBA), the hydroxyl group of the compound having a hydroxyl group and R in Formula (9) may be protected using an appropriate protecting group.

(9)

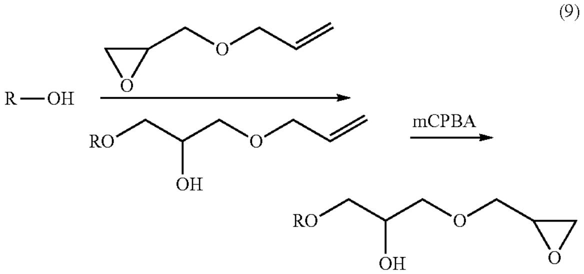

(in Formula (9), R represents a structure corresponding to the end group represented by $R^1$ or $R^6$ in Formula (1)).

In addition, the epoxy compound can be produced using the reaction shown in the following Formula (10), for example, when $R^2$ (=$R^5$) is the linking group represented by Formula (3-2) and t is 2.

That is, an alcohol having a structure (R in Formula (10)) corresponding to the end group represented by $R^1$ or $R^6$ in Formula (1) is reacted with a halogen compound having an alkenyl group corresponding to $R^2$ or $R^5$ such as 4-bromo-1-butene to synthesize a compound having R in Formula (10) and an alkenyl group. Then, a method of oxidizing the double bond of the compound having R in Formula (10) and an alkenyl group by the action of m-chloroperbenzoic acid (mCPBA) can be used for production.

(10)

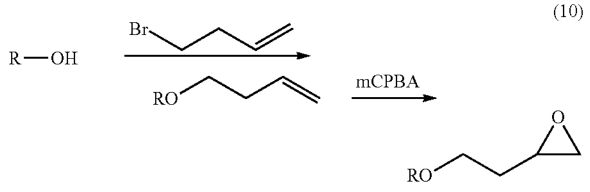

(in Formula (10), R represents a structure corresponding to the end group represented by $R^1$ or $R^6$ in Formula (1)).

Next, a fluorine-based compound in which hydroxymethyl groups ($—CH_2OH$) are disposed at both ends of the perfluoropolyether chain corresponding to $R^{3b}$ in Formula (1) is prepared. Next, the hydroxyl group of the hydroxymethyl group disposed at both ends of the fluorine-based compound is reacted with a halogen compound having an epoxy group corresponding to $R^{4a}$ ($=R^{4b}$) (second reaction). Therefore, an intermediate compound 2 having an epoxy group corresponding to $R^{4a}$ ($=R^{4b}$) at both ends of the perfluoropolyether chain corresponding to $R^{3b}$ in the molecule center in Formula (1) is obtained.

The intermediate compound 2 can be produced using a method of reacting the hydroxyl group of the fluorine-based compound in which hydroxymethyl groups ($—CH_2OH$) are disposed at both ends of the perfluoropolyether chain corresponding to $R^{3b}$ in Formula (1) with an epoxy compound or halogen compound having an alkenyl group corresponding to $R^{4a}$ ($=R^{4b}$), and then performing oxidizing by the action of m-chloroperbenzoic acid (mCPBA).

Then, the hydroxyl group of the hydroxymethyl group disposed at one end of the intermediate compound 1 is reacted with the epoxy group disposed at both ends of the intermediate compound 2 (third reaction).

When the above processes are performed, it is possible to produce a compound in which, in Formula (1), two PFPE chains represented by $R^{3a}$ and $R^{3c}$ are the same, two linking groups represented by $R^{4a}$ and $R^{4b}$ are the same, and $R^1—R^2—$ and $R^6—R^5—$ are the same.

In the present embodiment, the second reaction is performed after the first reaction, but the first reaction may be performed after the second reaction.

(Second Production Method)

When a compound is produced in which, in Formula (1), two linking groups represented by $R^{4a}$ and $R^{4b}$ are the same, and any one or more of PFPE chains represented by $R^1$ and $R^6$, $R^2$ and $R^5$, and $R^{3a}$ and $R^{3c}$ are different from each other, the following production method can be used.

First, in the first reaction, an intermediate compound 1a having a group corresponding to $R^1—R^2—$ at one end of the perfluoropolyether chain corresponding to $R^{3a}$ is synthesized. In addition, in the first reaction, an intermediate compound 1b having a group corresponding to $R^6—R^5—$ at one end of the perfluoropolyether chain corresponding to $R^{3c}$ is synthesized.

Next, in the same manner as in the first production method, a second reaction is performed to produce an intermediate compound 2.

Then, in the third reaction, the intermediate compound 1a and the intermediate compound 1b are sequentially reacted with the epoxy group disposed at each end of the intermediate compound 2.

When the above processes are performed, it is possible to produce a compound in which, in Formula (1), two linking groups represented by $R^{4a}$ and $R^{4b}$ are the same, and any one or more of PFPE chains represented by $R^1$ and $R^6$, $R^2$ and $R^5$, and $R^{3a}$ and $R^{3c}$ are different from each other.

(Third Production Method)

When a compound is produced in which, in Formula (1), two PFPE chains represented by $R^{3a}$ and $R^{3c}$ are the same, two linking groups represented by $R^{4a}$ and $R^{4b}$ are different from each other, and $R^1—R^2—$ and $R^6—R^5—$ are the same, the following production method can be used.

First, in the same manner as in the first production method, a first reaction is performed to produce an intermediate compound 1.

Next, in the second reaction, a fluorine-based compound in which a hydroxymethyl group ($—CH_2OH$) is disposed at both ends of the perfluoropolyether chain corresponding to $R^{3b}$ in Formula (1) is prepared. Next, the hydroxyl group of the hydroxymethyl group disposed at one end of the fluorine-based compound is reacted with a halogen compound having an epoxy group corresponding to $R^{4a}$. Subsequently, the hydroxyl group of the hydroxymethyl group disposed at the other end of the fluorine-based compound is reacted with a halogen compound having an epoxy group corresponding to $R^{4b}$. Therefore, an intermediate compound 2a in which an epoxy group corresponding to a linking group represented by $R^{4a}$ is bonded to one end of the perfluoropolyether chain corresponding to $R^{3b}$ in Formula (1) and an epoxy group corresponding to a linking group represented by $R^{4b}$ is bonded to the other end is obtained.

Then, in the third reaction, the hydroxyl group of the hydroxymethyl group disposed at one end of the intermediate compound 1 is reacted with the epoxy group disposed at both ends of the intermediate compound 2a.

When the above processes are performed, it is possible to produce a compound in which, in Formula (1), two PFPE chains represented by $R^{3a}$ and $R^{3c}$ are the same, two linking groups represented by $R^{4a}$ and $R^{4b}$ are different from each other, and $R^1—R^2—$ and $R^6$-$R^5—$ are the same.

(Fourth Production Method)

When a compound is produced in which, in Formula (1), two linking groups represented by $R^{4a}$ and $R^{4b}$ are different from each other, and any one or more of PFPE chains represented by $R^1$ and $R^6$, $R^2$ and $R^5$, and $R^{3a}$ and $R^{3c}$ are different from each other, the following production method can be used.

First, in the same manner as in the second production method, in the first reaction, an intermediate compound 1a having a group corresponding to $R^1—R^2—$ at one end of the perfluoropolyether chain corresponding to $R^{3a}$ is synthesized. In addition, in the first reaction, an intermediate compound 1b having a group corresponding to $R^6—R^5—$ at one end of the perfluoropolyether chain corresponding to $R^{3c}$ is synthesized.

Next, in the same manner as in the third production method, a second reaction is performed to produce an intermediate compound 2a.

Then, in the third reaction, the intermediate compound 1a is reacted with the epoxy group corresponding to the linking group represented by $R^{4a}$ in the intermediate compound 2a. Then, the intermediate compound 1b is reacted with the epoxy group corresponding to the linking group represented by $R^{4b}$ in the intermediate compound 2a. Alternatively, the intermediate compound 1b is reacted with the epoxy group corresponding to the linking group represented by $R^{4b}$ in the intermediate compound 2a. Then, the intermediate compound 1a is reacted with the epoxy group corresponding to the linking group represented by $R^{4a}$ in the intermediate compound 2a.

When the above processes are performed, it is possible to produce a compound in which, in Formula (1), two linking groups represented by $R^{4a}$ and $R^{4b}$ are different from each other, and any one or more of PFPE chains represented by $R^1$ and $R^6$, $R^2$ and $R^5$, and $R^{3a}$ and $R^{3c}$ are different from each other.

The fluorine-containing ether compound of the present embodiment is the compound represented by Formula (1). Therefore, a lubricating layer formed on the protective layer using the lubricant containing the fluorine-containing ether compound of the present embodiment has a strong effect of inhibiting corrosion of the magnetic recording medium and improves floating stability of a magnetic head even if the thickness is thin.

[Lubricant for Magnetic Recording Medium]

The lubricant for a magnetic recording medium of the present embodiment contains the fluorine-containing ether compound represented by Formula (1).

The lubricant of the present embodiment can be used by being mixed with a known material used as a material for the lubricant as necessary as long as the characteristics which are obtained due to the inclusion of the fluorine-containing ether compound represented by Formula (1) are not impaired.

Specific examples of known materials include, for example, FOMBLIN (registered trademark) ZDIAC, FOMBLIN ZDEAL, and FOMBLIN AM-2001 (all commercially available from Solvay Solexis), and Moresco A20H (commercially available from Moresco Corporation). A known material used in combination with the lubricant of the present embodiment preferably has a number-average molecular weight of 1,000 to 10,000.

When the lubricant of the present embodiment contains a material other than the fluorine-containing ether compound represented by Formula (1), the content of the fluorine-containing ether compound represented by Formula (1) in the lubricant of the present embodiment is preferably 50 mass % or more and more preferably 70 mass % or more. Since the lubricant of the present embodiment contains the fluorine-containing ether compound represented by Formula (1), even if the thickness is thin, it is possible to form a lubricating layer that has a strong effect of inhibiting corrosion of the magnetic recording medium and that improves floating stability of a magnetic head.

[Magnetic Recording Medium]

In the magnetic recording medium of the present embodiment, at least a magnetic layer, a protective layer, and a lubricating layer are sequentially provided on a substrate.

In the magnetic recording medium of the present embodiment, as necessary, one, two, or more underlayers can be provided between the substrate and the magnetic layer. In addition, at least one of the adhesive layer and the soft magnetic layer can be provided between the underlayer and the substrate.

The FIGURE is a schematic cross-sectional view showing one embodiment of the magnetic recording medium of the present invention.

A magnetic recording medium 10 of the present embodiment has a structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate in which a film made of NiP or a NiP alloy is formed on a base made of a metal or an alloy material such as Al or an Al alloy can be used.

In addition, as the substrate 11, a non-magnetic substrate made of a non-metal material such as glass, a ceramic, silicon, silicon carbide, carbon, and a resin may be used, or a non-magnetic substrate in which a film made of NiP or a NiP alloy is formed on a base of these non-metal materials may be used.

"Adhesive Layer"

The adhesive layer 12 prevents the progress of corrosion of the substrate 11 that occurs when the substrate 11 and the soft magnetic layer 13 provided on the adhesive layer 12 are disposed in contact with each other.

The material of the adhesive layer 12 can be appropriately selected from among, for example, Cr, a Cr alloy, Ti, a Ti alloy, CrTi, NiAl, and an AlRu alloy. The adhesive layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which an intermediate layer made of a Ru film is interposed between two soft magnetic film layers, and thus the soft magnetic films above and below the intermediate layer are bonded by anti-ferromagnetic coupling (AFC).

Examples of materials of the first soft magnetic film and the second soft magnetic film include a CoZrTa alloy and a CoFe alloy.

It is preferable to add any of Zr, Ta, and Nb to the CoFe alloy used for the first soft magnetic film and the second soft magnetic film. Thereby, the amorphization of the first soft magnetic film and the second soft magnetic film is promoted. As a result, the orientation of the first underlayer (seed layer) can be improved and the floating height of the magnetic head can be reduced.

The soft magnetic layer 13 can be formed by, for example, a sputtering method.

"First Underlayer"

The first underlayer 14 is a layer that controls the orientations and the crystal sizes of the second underlayer 15 and the magnetic layer 16 provided thereon.

Examples of the first underlayer 14 include a Cr layer, a Ta layer, a Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 such that it becomes favorable. The second underlayer 15 is preferably a layer made of Ru or a Ru alloy.

The second underlayer 15 may be a single layer or may be composed of a plurality of layers. When the second underlayer 15 is composed of a plurality of layers, all of the layers may be composed of the same material, or at least one layer may be composed of a different material.

The second underlayer 15 can be formed by, for example, a sputtering method.

"Magnetic Layer"

The magnetic layer 16 is made of a magnetic film in which the axis of easy magnetization is in a direction perpendicular to or horizontal to the surface of the substrate. The magnetic layer 16 is a layer containing Co and Pt. The magnetic layer 16 may be a layer containing an oxide, Cr, B, Cu, Ta, Zr, or the like in order to improve SNR characteristics.

Examples of oxides contained in the magnetic layer 16 include $SiO_2$, SiO, $Cr_2O_3$, CoO, $Ta_2O_3$, and $TiO_2$.

The magnetic layer 16 may be composed of a single layer or may be composed of a plurality of magnetic layers made of materials with different compositions.

For example, when the magnetic layer 16 is composed of three layers including a first magnetic layer, a second magnetic layer, and a third magnetic layer sequentially laminated from below, the first magnetic layer preferably has a granular structure made of a material containing Co, Cr, and Pt, and further containing an oxide. As the oxide contained in the first magnetic layer, for example, it is preferable to use an oxide of Cr, Si, Ta, Al, Ti, Mg, Co, or the like. Among these, particularly, $TiO_2$, $Cr_2O_3$, $SiO_2$, or the like can be preferably used. In addition, the first magnetic layer is preferably made of a composite oxide in which two or more oxides are added. Among these, particularly, $Cr_2O_3$—$SiO_2$, $Cr_2O_3$—$TiO_2$, $SiO_2$—$TiO_2$ or the like can be preferably used.

The first magnetic layer can contain one or more elements selected from among B, Ta, Mo, Cu, Nd, W, Nb, Sm, Tb, Ru, and Re in addition to Co, Cr, Pt, and an oxide.

For the second magnetic layer, the same material as for the first magnetic layer can be used. The second magnetic layer preferably has a granular structure.

The third magnetic layer preferably has a non-granular structure made of a material containing Co, Cr, and Pt and not containing an oxide. The third magnetic layer can contain one or more elements selected from among B, Ta, Mo, Cu, Nd, W, Nb, Sm, Tb, Ru, Re, and Mn in addition to Co, Cr, and Pt.

When the magnetic layer 16 is formed of a plurality of magnetic layers, it is preferable to provide a non-magnetic layer between adjacent magnetic layers. When the magnetic layer 16 is composed of three layers including a first magnetic layer, a second magnetic layer, and a third magnetic layer, it is preferable to provide a non-magnetic layer between the first magnetic layer and the second magnetic layer and between the second magnetic layer and the third magnetic layer.

For the non-magnetic layer provided between adjacent magnetic layers of the magnetic layer 16, for example, Ru, a Ru alloy, a CoCr alloy, a CoCrX1 alloy (X1 represents one, two, or more elements selected from among Pt, Ta, Zr, Re, Ru, Cu, Nb, Ni, Mn, Ge, Si, O, N, W, Mo, Ti, V, and B), or the like can be preferably used.

For the non-magnetic layer provided between adjacent magnetic layers of the magnetic layer 16, it is preferable to use an alloy material containing an oxide, a metal nitride, or a metal carbide. Specifically, as the oxide, for example, $SiO_2$, $Al_2O_3$, $Ta_2O_5$, $Cr_2O_3$, MgO, $Y_2O_3$, $TiO_2$, or the like can be used. As the metal nitride, for example, AlN, $Si_3N_4$, TaN, CrN, or the like can be used. As the metal carbide, for example, TaC, BC, SiC, or the like can be used.

The non-magnetic layer can be formed by, for example, a sputtering method.

The magnetic layer 16 is preferably a magnetic layer for perpendicular magnetic recording in which the axis of easy magnetization is in a direction perpendicular to the surface of the substrate in order to realize a higher recording density. The magnetic layer 16 may be a magnetic layer for in-plane magnetic recording.

The magnetic layer 16 may be formed by any conventionally known method such as a vapor deposition method, an ion beam sputtering method, and a magnetron sputtering method. The magnetic layer 16 is generally formed by a sputtering method.

"Protective Layer"

The protective layer 17 protects the magnetic layer 16. The protective layer 17 may be composed of one layer or may be composed of a plurality of layers. As the protective layer 17, a carbon-based protective layer can be preferably used, and an amorphous carbon protective layer is particularly preferable. When the protective layer 17 is a carbon-based protective layer, this is preferable because the interaction with the polar group (particularly the hydroxyl group) contained in the fluorine-containing ether compound in the lubricating layer 18 is further improved.

The adhesive force between the carbon-based protective layer and the lubricating layer 18 can be controlled by forming a carbon-based protective layer with hydrogenated carbon and/or nitrogenated carbon and adjusting the hydrogen content and/or nitrogen content in the carbon-based protective layer. The hydrogen content in the carbon-based protective layer measured by a hydrogen forward scattering (HFS) method is preferably 3 atom % to 20 atom %. In addition, the nitrogen content in the carbon-based protective layer measured through X-ray photoelectron spectroscopy (XPS) is preferably 4 atom % to 15 atom %.

Hydrogen and/or nitrogen contained in the carbon-based protective layer need not be uniformly contained through the entire carbon-based protective layer. For example, the carbon-based protective layer is preferably formed as a composition gradient layer in which nitrogen is contained in the protective layer 17 on the side of the lubricating layer 18 and hydrogen is contained in the protective layer 17 on the side of the magnetic layer 16. In this case, the adhesive force between the magnetic layer 16 and the lubricating layer 18, and the carbon-based protective layer is further improved.

The film thickness of the protective layer 17 is preferably 1 nm to 7 nm. When the film thickness of the protective layer 17 is 1 nm or more, the performance of the protective layer 17 can be sufficiently obtained. The film thickness of the protective layer 17 is preferably 7 nm or less in order to reduce the thickness of the protective layer 17.

As a film formation method for the protective layer 17, a sputtering method using a target material containing carbon, a chemical vapor deposition (CVD) method using a hydrocarbon raw material such as ethylene or toluene, an ion beam deposition (IBD) method, or the like can be used.

When a carbon-based protective layer is formed as the protective layer 17, for example, a film can be formed by a DC magnetron sputtering method. Particularly, when a carbon-based protective layer is formed as the protective layer 17, it is preferable to form an amorphous carbon protective layer by a plasma CVD method. The amorphous carbon protective layer formed by the plasma CVD method has uniform surfaces and low roughness.

"Lubricating Layer"

The lubricating layer 18 prevents contamination of the magnetic recording medium 10. In addition, the lubricating layer 18 reduces a frictional force of a magnetic head of a magnetic recording and reproducing device, which slides on the magnetic recording medium 10, and improves the durability of the magnetic recording medium 10.

As shown in the FIGURE, the lubricating layer 18 is formed on and in contact with the protective layer 17. The lubricating layer 18 is formed by applying the lubricant for a magnetic recording medium according to the embodiment described above to the protective layer 17. Therefore, the lubricating layer 18 contains the above fluorine-containing ether compound.

When the protective layer 17 arranged below the lubricating layer 18 is a carbon-based protective layer, particularly, the lubricating layer 18 is bonded to the protective layer 17 with a high bonding force. As a result, even if the thickness of the lubricating layer 18 is thin, it is easy to obtain the magnetic recording medium 10 in which the surface of the protective layer 17 is covered at a high coating rate, and it is possible to effectively prevent contamination of the surface of the magnetic recording medium 10.

The average film thickness of the lubricating layer 18 is preferably 0.5 nm (5 Å) to 2.0 nm (20 Å) and more preferably 0.5 nm (5 Å) to 1.2 nm (12 Å). When the average film thickness of the lubricating layer 18 is 0.5 nm or more, the lubricating layer 18 is formed with a uniform film thickness without forming an island shape or a mesh shape. Therefore, the surface of the protective layer 17 can be coated with the lubricating layer 18 at a high coating rate. In addition, when the average film thickness of the lubricating layer 18 is 2.0 nm or less, the lubricating layer 18 can be made sufficiently thin, and the floating height of the magnetic head can be sufficiently reduced.

"Method of Forming Lubricating Layer"

Examples of methods of forming the lubricating layer 18 include a method in which a magnetic recording medium is prepared during production in which respective layers up to the protective layer 17 are formed on the substrate 11, and a lubricating layer forming solution is applied onto the protective layer 17 and dried.

The lubricating layer forming solution can be obtained by dispersing and dissolving the lubricant for a magnetic recording medium of the embodiment described above in a solvent as necessary, and adjusting the viscosity and concentration to be suitable for application methods.

Examples of solvents used for the lubricating layer forming solution include fluorine-based solvents such as Vertrel (registered trademark) XF (product name, commercially available from Du Pont-Mitsui Fluorochemicals Co., Ltd.).

The method of applying the lubricating layer forming solution is not particularly limited, and examples thereof include a spin coating method, a spraying method, a paper coating method, and a dipping method.

When the dipping method is used, for example, the following method can be used. First, the substrate 11 in which respective layers up to the protective layer 17 are formed is immersed in the lubricating layer forming solution contained in an immersion tank of a dip coating device. Next, the substrate 11 is lifted from the immersion tank at a predetermined speed. Accordingly, the lubricating layer forming solution is applied to the surface of the protective layer 17 of the substrate 11.

When the dipping method is used, the lubricating layer forming solution can be uniformly applied to the surface of the protective layer 17, and the lubricating layer 18 with a uniform film thickness can be formed on the protective layer 17.

In the present embodiment, the substrate 11 in which the lubricating layer 18 is formed is preferably subjected to a heat treatment. When the heat treatment is performed, the adhesion between the lubricating layer 18 and the protective layer 17 is improved, and the adhesive force between the lubricating layer 18 and the protective layer 17 is improved.

The heat treatment temperature is preferably 100° C. to 180° C. and more preferably 100° C. to 160° C. When the heat treatment temperature is 100° C. or higher, an effect of improving the adhesion between the lubricating layer 18 and the protective layer 17 is sufficiently obtained. In addition, when the heat treatment temperature is 180° C. or lower, it is possible to prevent thermal decomposition of the lubricating layer 18 due to the heat treatment. The heat treatment time can be appropriately adjusted according to the heat treatment temperature, and is preferably 10 minutes to 120 minutes.

In the present embodiment, in order to further improve the adhesive force of the lubricating layer 18 with respect to the protective layer 17, an ultraviolet ray (UV) emitting treatment may be performed on the lubricating layer 18 before the thermal treatment or after the thermal treatment.

In the magnetic recording medium 10 of the present embodiment, at least the magnetic layer 16, the protective layer 17, and the lubricating layer 18 are sequentially provided on the substrate 11. In the magnetic recording medium 10 of the present embodiment, the lubricating layer 18 containing the above fluorine-containing ether compound is formed on and in contact with the protective layer 17. The lubricating layer 18 improves floating stability of a magnetic head and has a strong effect of inhibiting corrosion of the magnetic recording medium, even if the film thickness is thin. Accordingly, the magnetic recording medium 10 of the present embodiment has excellent reliability and durability. In addition, the magnetic recording medium 10 of the present embodiment can achieve a small floating height of the magnetic head (for example, 10 nm or less), and operates stably for a long period of time even in a harsh environment due to diversity of applications. Therefore, the magnetic recording medium 10 of the present embodiment is particularly preferable as a magnetic disk mounted in a load-unload (LUL) type magnetic disk device.

EXAMPLES

Hereinafter, the present invention will be described in more detail with reference to examples and comparative examples. Here, the present invention is not limited to the following examples.

Example 1

The compound represented by Formula (A) was obtained by the following method.

(First Reaction)

20 g of a compound (a number-average molecular weight of 1,000, a molecular weight distribution of 1.1) represented by $HOCH_2CF_2(OCF_2CF_2)_h(OCF_2)_iOCF_2CH_2OH$ (in the formula, h indicating an average degree of polymerization is 4.5, and i indicating an average degree of polymerization is 4.5), 2.55 g of the compound represented by Formula (7-1), and 20 mL of t-butanol were put into a 100 mL eggplant flask under a nitrogen gas atmosphere, and stirred until they became uniform at room temperature to form a mixture. 0.90 g of potassium tert-butoxide was added to the mixture, and the mixture was stirred and reacted at 70° C. for 16 hours.

The compound represented by Formula (7-1) was synthesized by reacting 2-cyanoethanol with epibromohydrin.

The reaction product obtained after the reaction was cooled to 25° C., transferred into a separatory funnel containing 100 mL of water, and extracted three times with 100 mL of ethyl acetate. The organic layer was washed with water and dehydrated with anhydrous sodium sulfate. After the drying agent was filtered, the filtrate was concentrated, and the residue was purified through silica gel column chromatography to obtain 8.98 g of a compound represented by the following Formula (11) as an intermediate.

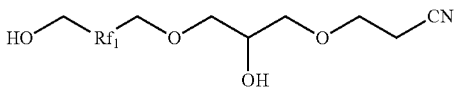

(11)

(in Formula (11), $Rf_1$ is the PFPE chain represented by Formula (4-1); in $Rf_1$, h indicating an average degree of polymerization represents 4.5, and i indicating an average degree of polymerization represents 4.5).

(Second Reaction)

Next, a compound (a number-average molecular weight of 1,000, a molecular weight distribution of 1.1) represented by $HOCH_2CF_2(OCF_2CF_2)_h(OCF_2)_iOCF_2CH_2OH$ (in the formula, h indicating an average degree of polymerization is 4.5, and i indicating an average degree of polymerization is 4.5) is reacted with epibromohydrin to obtain a compound represented by Formula (12) as an intermediate.

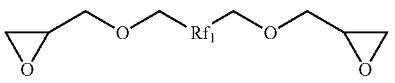

(12)

(in Formula (12), $Rf_1$ is the PFPE chain represented by Formula (4-1); and in $Rf_1$, h indicating an average degree of polymerization represents 4.5, and i indicating an average degree of polymerization represents 4.5).

(Third Reaction)

Subsequently, 8.98 g of the compound represented by Formula (11) as the intermediate obtained above, 4.55 g of the compound represented by Formula (12), and 10 mL of t-butanol were put into a 100 mL eggplant flask under a nitrogen gas atmosphere, and stirred until they became uniform at room temperature to form a mixture. 0.95 g of potassium tert-butoxide was added to the mixture, and the mixture was stirred and reacted at 70° C. for 23 hours.

The reaction solution obtained after the reaction was returned to room temperature, 5 g of a 10% hydrogen chloride/methanol solution (hydrogen chloride-methanol reagent (5-10%), commercially available from Tokyo Chemical Industry Co., Ltd.) was added, and the mixture was stirred at room temperature for 4 hours. Then, the reaction solution was transferred little by little into a separatory funnel containing 100 mL of saline, and extracted twice with 200 mL of ethyl acetate. The organic layer was washed with 100 mL of saline, 100 mL of a saturated sodium bicarbonate solution, and 100 mL of saline in that order and dehydrated with anhydrous sodium sulfate. After the drying agent was filtered, the filtrate was concentrated, and the residue was purified through silica gel column chromatography to obtain 8.15 g of a compound (A) (in Formula (A), $Rf_1$ is the PFPE chain represented by Formula (4-1); and in three $Rf_1$'s, h indicating an average degree of polymerization represents 4.5, and i indicating an average degree of polymerization represents 4.5).

The obtained compound (A) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (28H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 2

The compound represented by Formula (B) was obtained by the following method.

The same operation as in Example 1 was performed except that, in place of the compound represented by Formula (7-1) in Example 1, a compound represented by Formula (7-2) was used, and thereby 8.42 g of a compound (B) (in Formula (B), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-2) was synthesized using the following method. First, a compound having a cyano group and a hydroxyl group was synthesized by an addition reaction between 2-cyanoethanol and allyl glycidyl ether. Then, the secondary hydroxyl group of the synthesized compound having a cyano group and a hydroxyl group was protected using dihydropyran, and the double bond was oxidized using m-chloroperbenzoic acid to obtain an epoxy compound having a cyano group represented by Formula (7-2).

The obtained compound (B) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (40H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 3

The compound represented by Formula (C) was obtained by the following method.

The same operation as in Example 1 was performed except that, in place of the compound represented by Formula (7-1) in Example 1, a compound represented by Formula (7-3) was used, and thereby 8.21 g of a compound (C) (in Formula (C), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-3) was synthesized by protecting the secondary hydroxyl group of glycerin diglycidyl ether using dihydropyran and then performing a mono-addition reaction of 2-cyanoethanol.

The obtained compound (C) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (52H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 4

The compound represented by Formula (D) was obtained by the following method.

The same operation as in Example 1 was performed except that, in place of the compound represented by Formula (7-1) in Example 1, a compound represented by Formula (7-4) was used, and thereby 8.15 g of a compound (D) (in Formula (D), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-4) was synthesized by reacting 3-cyanopropanol with epibromohydrin.

The obtained compound (D) was subjected to $^1$H-NMR and $^{19}$F-NMR measurement, and the structure was identified based on the following results.

$^1$H-NMR (acetone-$D_6$): δ[ppm]=1.15 to 1.25 (4H), 2.00 to 2.10 (4H), 3.65 to 3.85 (28H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 5

The compound represented by Formula (E) was obtained by the following method.

The same operation as in Example 1 was performed except that, in place of the compound represented by Formula (7-1) in Example 1, a compound represented by Formula (7-5) was used, and thereby 8.08 g of a compound (E) (in Formula (E), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-5) was synthesized by reacting 3-hydroxybutyronitrile with epibromohydrin.

The obtained compound (E) was subjected to $^1$H-NMR and $^{19}$F-NMR measurement, and the structure was identified based on the following results.

$^1$H-NMR (acetone-$D_6$): δ[ppm]=1.10 (6H), 2.00 to 2.10 (4H), 3.65 to 3.85 (26H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 6

The compound represented by Formula (F) was obtained by the following method.

The same operation as in Example 1 was performed except that, in place of the compound represented by Formula (7-1) in Example 1, a compound represented by Formula (7-6) was used, and thereby 8.31 g of a compound (F) (in Formula (F), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-6) was synthesized by reacting 3-hydroxyglutaronitrile with epibromohydrin.

The obtained compound (F) was subjected to $^1$H-NMR and $^{19}$F-NMR measurement, and the structure was identified based on the following results.

$^1$H-NMR (acetone-$D_6$): δ[ppm]=2.00 to 2.10 (8H), 3.65 to 3.85 (26H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 7

The compound represented by Formula (G) was obtained by the following method.

The same operation as in Example 1 was performed except that, in place of the compound represented by Formula (7-1) in Example 1, a compound represented by Formula (7-7) was used, and thereby 7.42 g of a compound (G) (in Formula (G), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-7) was synthesized by oxidizing the double bond of allyl cyanoacetate using m-chloroperbenzoic acid.

The obtained compound (G) was subjected to $^1$H-NMR and $^{19}$F-NMR measurement, and the structure was identified based on the following results.

$^1$H-NMR (acetone-$D_6$): δ[ppm]=3.30 (4H), 3.65 to 3.85 (26H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 8

The compound represented by Formula (H) was obtained by the following method.

The same operation as in Example 1 was performed except that, in place of the compound represented by Formula (7-1) in Example 1, a compound represented by Formula (7-8) was used, and thereby 8.36 g of a compound (H) (in Formula (H), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-8) was synthesized by reacting 2-cyanoethanol and 4-bromo-1-butene and then oxidizing the double bond of the obtained compound using m-chloroperbenzoic acid.

The obtained compound (H) was subjected to $^1$H-NMR and $^{19}$F-NMR measurement, and the structure was identified based on the following results.

$^1$H-NMR (acetone-$D_6$): δ[ppm]=1.15 to 1.25 (4H), 2.00 to 2.10 (4H), 3.65 to 3.85 (28H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 9

The compound represented by Formula (1) was obtained by the following method.

The same operation as in Example 1 was performed except that, in place of the compound represented by Formula (7-1) in Example 1, a compound represented by Formula (7-9) was used, and thereby 8.51 g of a compound (I) (in Formula (I), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-9) was synthesized by reacting 2-cyanophenol with epibromohydrin.

The obtained compound (I) was subjected to $^1$H-NMR and $^{19}$F-NMR measurement, and the structure was identified based on the following results.

$^1$H-NMR (acetone-$D_6$): δ[ppm]=3.65 to 3.85 (24H), 3.85 to 4.10 (12H), 7.20 to 8.20 (8H)

$^{19}$F-NMR (acetone-$D_6$): δ[ppm]−55.5 to −51.5 (27F), −78.5 (6F), −80.5 (6F), −91.0 to −88.5 (54F)

Example 10

The compound represented by Formula (J) was obtained by the following method.

The same operation as in Example 1 was performed except that, in place of the compound represented by Formula (7-1) in Example 1, a compound represented by Formula (7-10) was used, and thereby 8.82 g of a compound (J) (in Formula (J), $Rf_1$ is the PFPE chain represented by Formula (4-1); and in three $Rf_1$'s, h indicating an average degree of polymerization represents 4.5, and i indicating an average degree of polymerization represents 4.5) was obtained.

The compound represented by Formula (7-10) was synthesized using the following method. First, a compound having a cyano group and a hydroxyl group was synthesized by an addition reaction between 4-cyanophenol and allyl glycidyl ether. Then, the secondary hydroxyl group of the synthesized compound having a cyano group and a hydroxyl group was protected using dihydropyran, and the double bond was oxidized using m-chloroperbenzoic acid to obtain an epoxy compound having a cyano group represented by Formula (7-10).

The obtained compound (J) was subjected to $^1$H-NMR and $^{19}$F-NMR measurement, and the structure was identified based on the following results.

$^1$H-NMR (acetone-$D_6$): δ[ppm]=3.65 to 3.85 (36H), 3.85 to 4.10 (12H), 7.20 to 8.20 (8H)

$^{19}$F-NMR (acetone-$D_6$): δ[ppm]=−55.5 to −51.5 (27F), −78.5 (6F), −80.5 (6F), −91.0 to −88.5 (54F)

Example 11

The compound represented by Formula (K) was obtained by the following method.

First, the first reaction and the second reaction were performed in the same manner as in Example 1 to obtain a compound represented by Formula (11) and a compound represented by Formula (12) as a first intermediate compound 1a.

Next, the same operation as in the first reaction in Example 1 was performed except that, in place of the compound represented by Formula (7-1), a compound represented by Formula (7-2) was used, and thereby a compound represented by the following Formula (13) was obtained as a second intermediate compound 1b.

(13)

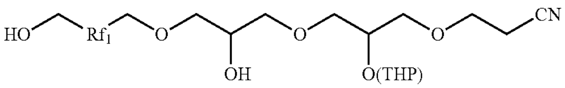

(in Formula (13), $Rf_1$ is the PFPE chain represented by Formula (4-1); in $Rf_1$, h indicating an average degree of polymerization represents 4.5, and i indicating an average degree of polymerization represents 4.5; and THP represents a tetrahydropyranyl group).

Next, 4.49 g of the compound represented by Formula (11) as the first intermediate compound 1a, 4.55 g of the compound represented by Formula (12), and 20 mL of t-butanol were put into a 100 mL eggplant flask under a nitrogen gas atmosphere, and stirred until they became uniform at room temperature to form a mixture. 0.47 g of potassium tert-butoxide was added to the mixture, and the mixture was stirred and reacted at 70° C. for 23 hours.

The reaction product obtained after the reaction was cooled to 25° C., transferred into a separatory funnel containing 100 mL of water, and extracted three times with 100 mL of ethyl acetate. The organic layer was washed with water and dehydrated with anhydrous sodium sulfate. After the drying agent was filtered, the filtrate was concentrated, and the residue was purified through silica gel column chromatography to obtain 3.81 g of a compound represented by the following Formula (14).

(14)

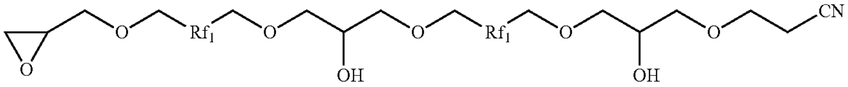

(in Formula (14), $Rf_1$ is the PFPE chain represented by Formula (4-1); and in $Rf_1$, h indicating an average degree of polymerization represents 4.5, and i indicating an average degree of polymerization represents 4.5).

Subsequently, 3.81 g of the compound represented by Formula (14) obtained above, 2.02 g of the compound represented by Formula (13) as a second intermediate compound 1b, and 10 mL of t-butanol were put into a 100 mL eggplant flask under a nitrogen gas atmosphere, and the mixture was stirred at room temperature until it became uniform. 0.45 g of potassium tert-butoxide was added to this uniform solution, and the mixture was stirred and reacted at 70° C. for 23 hours.

The reaction solution obtained after the reaction was returned to room temperature, 5 g of a 10% hydrogen chloride/methanol solution (hydrogen chloride-methanol reagent (5-10%) commercially available from Tokyo Chemical Industry Co., Ltd.) was added, and the mixture was stirred at room temperature for 4 hours. Then, the reaction solution was transferred little by little into a separatory funnel containing 100 mL of saline, and extracted twice with 200 mL of ethyl acetate. The organic layer was washed with 100 mL of saline, 100 mL of a saturated sodium bicarbonate solution, and 100 mL of saline in that order and dehydrated with anhydrous sodium sulfate. After the drying agent was filtered, the filtrate was concentrated, and the residue was purified through silica gel column chromatography to obtain 4.10 g of a compound (K) (in Formula (K), $Rf_1$ is the PFPE chain represented by Formula (4-1); and in three $Rf_1$'s, h indicating an average degree of polymerization represents 4.5, and i indicating an average degree of polymerization represents 4.5).

The obtained compound (K) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (34H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 12

The compound represented by Formula (L) was obtained by the following method.

The same operation as in Example 11 was performed except that, in place of the compound represented by Formula (7-2) in Example 11, a compound represented by Formula (7-3) was used to obtain a second intermediate compound 1b, and thereby 4.05 g of a compound (L) (in Formula (L), $Rf_1$ is the PFPE chain represented by Formula (4-1); and in three $Rf_1$'s, h indicating an average degree of polymerization represents 4.5, and i indicating an average degree of polymerization represents 4.5) was obtained.

The obtained compound (L) was subjected to $^{1}$H-NMR and $^{19}$F-NMR measurement, and the structure was identified based on the following results.

$^{1}$H-NMR (acetone-$D_6$): δ[ppm]=2.00 to 2.10 (4H), 3.65 to 3.85 (40H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 13

The compound represented by Formula (M) was obtained by the following method.

The same operation as in Example 12 was performed except that, in place of the compound represented by Formula (7-1) in Example 12, a compound represented by Formula (7-2) was used to obtain a first intermediate compound 1a, and thereby 3.93 g of a compound (M) (in Formula (M), $Rf_1$ is the PFPE chain represented by Formula (4-1); and in three $Rf_1$'s, h indicating an average degree of polymerization represents 4.5, and i indicating an average degree of polymerization represents 4.5) was obtained.

The obtained compound (M) was subjected to $^{1}$H-NMR and $^{19}$F-NMR measurement, and the structure was identified based on the following results.

$^{1}$H-NMR (acetone-$D_6$): δ[ppm]=2.00 to 2.10 (4H), 3.65 to 3.85 (46H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 14

The compound represented by Formula (N) was obtained by the following method.

The same operation as in Example 11 was performed except that, in place of the compound represented by Formula (7-1) in Example 11, a compound represented by Formula (7-9) was used to obtain a first intermediate compound 1a, and thereby 4.42 g of a compound (N) (in Formula (N), $Rf_1$ is the PFPE chain represented by Formula (4-1); and in three $Rf_1$'s, h indicating an average degree of polymerization represents 4.5, and i indicating an average degree of polymerization represents 4.5) was obtained.

The obtained compound (N) was subjected to $^{1}$H-NMR and $^{19}$F-NMR measurement, and the structure was identified based on the following results.

$^{1}$H-NMR (acetone-$D_6$): δ[ppm]=2.00 to 2.10 (2H), 3.65 to 3.85 (32H), 3.85 to 4.10 (12H), 7.20 to 8.20 (4H)

$^{19}$F-NMR (acetone-$D_6$): δ[ppm]=−55.5 to −51.5 (27F), −78.5 (6F), −80.5 (6F), −91.0 to −88.5 (54F)

Example 15

The compound represented by Formula (O) was obtained by the following method.

The same operation as in Example 11 was performed except that, in place of the compound represented by Formula (7-1) in Example 11, a compound represented by the following Formula (15) was used to obtain a first intermediate compound 1a, and thereby 4.28 g of a compound (O) (in Formula (O), $Rf_1$ is the PFPE chain represented by Formula (4-1); and in three $Rf_1$'s, h indicating an average degree of polymerization represents 4.5, and i indicating an average degree of polymerization represents 4.5) was obtained.

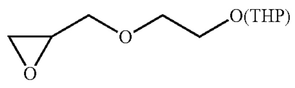

(15)

(in Formula (15), THP represents a tetrahydropyranyl group).

The compound represented by Formula (15) was synthesized by protecting the hydroxyl group of ethylene glycol monoallyl ether using dihydropyran and oxidizing the obtained compound.

The obtained compound (O) was subjected to $^{1}$H-NMR and $^{19}$F-NMR measurement, and the structure was identified based on the following results.

$^{1}$H-NMR (acetone-$D_6$): δ[ppm]=2.00 to 2.10 (2H), 3.65 to 3.85 (37H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 16

The compound represented by Formula (P) was obtained by the following method.

The same operation as in Example 11 was performed except that, in place of the compound represented by Formula (7-1) in Example 11, a compound represented by the following Formula (16) was used to obtain a first intermediate compound 1a, and thereby 4.58 g of a compound (P) (in Formula (P), $Rf_1$ is the PFPE chain represented by Formula (4-1); and in three $Rf_1$'s, h indicating an average degree of polymerization represents 4.5, and i indicating an average degree of polymerization represents 4.5) was obtained.

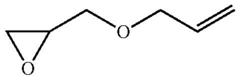

(16)

The compound represented by Formula (16) was synthesized by reacting an allyl alcohol with epibromohydrin.

The obtained compound (P) was subjected to $^{1}$H-NMR and $^{19}$F-NMR measurement, and the structure was identified based on the following results.

$^{1}$H-NMR (acetone-$D_6$): δ[ppm]=2.00 to 2.10 (2H), 3.65 to 3.85 (34H), 3.85 to 4.10 (12H), 5.40 to 6.10 (3H)

$^{19}$F-NMR (acetone-$D_6$): δ[ppm]=−55.5 to −51.5 (27F), −78.5 (6F), −80.5 (6F), −91.0 to −88.5 (54F)

Example 17

The compound represented by Formula (Q) was obtained by the following method.

The same operation as in Example 11 was performed except that, in place of the compound represented by Formula (7-1) in Example 11, a compound represented by the following Formula (17) was used to obtain a first intermediate compound 1a, and thereby 4.71 g of a compound (Q) (in Formula (Q), $Rf_1$ is the PFPE chain represented by Formula (4-1); and in three $Rf_1$'s, h indicating an average degree of polymerization represents 4.5, and i indicating an average degree of polymerization represents 4.5) was obtained.

(17)

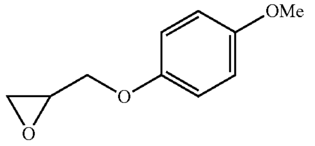

The compound represented by Formula (17) was synthesized by reacting 4-methoxyphenol with epibromohydrin. Here, in the formula, Me represents a methyl group.

The obtained compound (Q) was subjected to $^1$H-NMR and $^{19}$F-NMR measurement, and the structure was identified based on the following results.

$^1$H-NMR (acetone-$D_6$): δ[ppm]=2.00 to 2.10 (2H), 3.65 to 3.85 (35H), 3.85 to 4.10 (12H), 6.70 to 7.40 (5H)

$^{19}$F-NMR (acetone-$D_6$): δ[ppm]=−55.5 to −51.5 (27F), −78.5 (6F), −80.5 (6F), −91.0 to −88.5 (54F)

Example 18

The compound represented by Formula (R) was obtained by the following method.

The same operation as in Example 11 was performed except that, in place of the compound represented by Formula (7-1) in Example 11, a compound represented by the following Formula (18) was used to obtain a first intermediate compound 1a, and thereby 4.28 g of a compound (R) (in Formula (R), $Rf_1$ is the PFPE chain represented by Formula (4-1); and in three $Rf_1$'s, h indicating an average degree of polymerization represents 4.5, and i indicating an average degree of polymerization represents 4.5) was obtained.

(18)

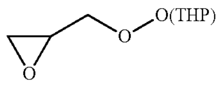

(in Formula (18), THP represents a tetrahydropyranyl group).

The compound represented by Formula (18) was synthesized by protecting the hydroxyl group of a homoallylic alcohol using dihydropyran and oxidizing the obtained compound.

The obtained compound (R) was subjected to $^1$H-NMR and $^{19}$F-NMR measurement, and the structure was identified based on the following results.

$^1$H-NMR (acetone-$D_6$): δ[ppm]=1.20 to 1.80 (2H), 2.00 to 2.10 (2H), 3.65 to 3.85 (33H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Example 19

The compound represented by Formula (S) was obtained by the following method.

The same operation as in Example 1 was performed except that, in place of a compound represented by $HOCH_2CF_2(OCF_2CF_2)_h(OCF_2)_iOCF_2CH_2OH$ in the first reaction and the second reaction in Example 1, a compound (a number-average molecular weight of 1,000, a molecular weight distribution of 1.1) represented by $HOCH_2CF_2CF_2(OCF_2CF_2CF_2)_jOCF_2CF_2CH_2OH$ (in the formula, j indicating an average degree of polymerization is 4.5) was used, and in place of the compound represented by Formula (7-1), a compound represented by Formula (7-2) was used, and thereby 7.96 g of a compound (S) (in Formula (S), $Rf_2$ is the PFPE chain represented by Formula (4-2); and in three $Rf_2$'s, j indicating an average degree of polymerization represents 4.5) was obtained.

The obtained compound (S) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (40H), 3.85 to 4.10 (12H)

$^{19}$F-NMR (acetone-$D_6$): δ[ppm]=−84.0 to −83.0 (54F), −86.4 (12F), −124.3 (12F), −130.0 to −129.0 (27F)

Example 20

The compound represented by Formula (T) was obtained by the following method.

The same operation as in Example 1 was performed except that, in place of a compound represented by $HOCH_2CF_2(OCF_2CF_2)_h(OCF_2)_iOCF_2CH_2OH$ in the first reaction and the second reaction in Example 1, a compound (a number-average molecular weight of 1,000, a molecular weight distribution of 1.1) represented by $HOCH_2CF_2CF_2CF_2(OCF_2CF_2CF_2CF_2)_kOCF_2CF_2CF_2CH_2OH$ (in the formula, k indicating an average degree of polymerization is 3.0) was used, and in place of the compound represented by Formula (7-1), a compound represented by Formula (7-2) was used, and thereby 7.85 g of a compound (T) (in Formula (T), $Rf_3$ is the PFPE chain represented by Formula (4-3); and in three $Rf_3$'s, k indicating an average degree of polymerization represents 3.0) was obtained.

The obtained compound (T) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (40H), 3.85 to 4.10 (12H)

$^{19}$F-NMR (acetone-$D_6$): δ[ppm]=−84.0 to −83.0 (48F), −122.5 (12F), −126.0 (36F), −129.0 to −128.0 (12F)

Example 21

The compound represented by Formula (U) was obtained by the following method.

The same operation as in Example 1 was performed except that, in place of a compound represented by $HOCH_2CF_2(OCF_2CF_2)_h(OCF_2)_iOCF_2CH_2OH$ in the first reaction in Example 1, a compound (a number-average molecular weight of 1,000, a molecular weight distribution of 1.1) represented by $HOCH_2CF_2CF_2(OCF_2CF_2CF_2)_jOCF_2CF_2CH_2OH$ (in the formula, j indicating an average degree of polymerization is 4.5) was used, in place of a compound represented by $HOCH_2CF_2(OCF_2CF_2)_h(OCF_2)_i OCF_2CH_2OH$ in the second reaction, a compound (a number-average molecular weight of 1,000, a molecular weight distribution of 1.1) represented by $HOCH_2CF_2(OCF_2CF_2)_h OCF_2CH_2OH$ (in the formula, h indicating an average degree of polymerization is 7.0) was used, and in place of the compound represented by Formula (7-1), a compound represented by Formula (7-2) was used, and thereby 7.46 g of a compound (U) (in Formula (U), $Rf_1$ is the PFPE chain represented by Formula (4-1); in $Rf_1$, h indicating an average degree of polymerization represents 7.0, and i indicating an average degree of polymerization represents 0; $Rf_2$ is the PFPE chain represented by Formula (4-2); and in two $Rf_2$'s, j indicating an average degree of polymerization represents 4.5) was obtained.

The obtained compound (U) was subjected to $^1$H-NMR and $^{19}$F-NMR measurement, and the structure was identified based on the following results.

$^1$H-NMR (acetone-$D_6$): δ[ppm]=2.00 to 2.10 (4H), 3.65 to 3.85 (40H), 3.85 to 4.10 (12H)

$^{19}$F-NMR (acetone-$D_6$): δ[ppm]=−80.5 (4F), −91.0 to −88.5 (28F), −84.0 to −83.0 (36F), −86.4 (8F), −124.3 (8F), −130.0 to −129.0 (18F)

Example 22

The compound represented by Formula (V) was obtained by the following method.

First, a compound (a number-average molecular weight of 1,000, a molecular weight distribution of 1.1) represented by $HOCH_2CF_2(OCF_2CF_2)_h(OCF_2)_iOCF_2CH_2OH$ (in the formula, h indicating an average degree of polymerization is 4.5, and i indicating an average degree of polymerization is 4.5) was reacted with 4-bromo-1-butene, and the double bond of the obtained compound was then oxidized using m-chloroperbenzoic acid to obtain a compound represented by Formula (19) as an intermediate.

(19)

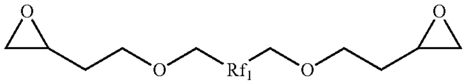

(in Formula (19), $Rf_1$ is the PFPE chain represented by Formula (4-1); and in $Rf_1$, h indicating an average degree of polymerization represents 4.5, and i indicating an average degree of polymerization represents 4.5).

The same operation as in Example 1 was performed except that, in place of the compound represented by Formula (12) as an intermediate in Example 1, the compound represented by Formula (19) was used, and in place of the compound represented by Formula (7-1), the compound represented by Formula (7-2) was used, and thereby 8.23 g of a compound (V) (in Formula (V), $Rf_1$ is the PFPE chain represented by Formula (4-1); and in three $Rf_1$'s, h indicating an average degree of polymerization represents 4.5, and i indicating an average degree of polymerization represents 4.5) was obtained.

The obtained compound (V) was subjected to $^1$H-NMR and $^{19}$F-NMR measurement, and the structure was identified based on the following results.

$^1$H-NMR (acetone-$D_6$): δ[ppm]=1.20 to 1.80 (4H), 2.00 to 2.10 (4H), 3.65 to 3.85 (40H), 3.85 to 4.10 (12H)

$^{19}$F-NMR (acetone-$D_6$): δ[ppm]=−55.5 to −51.5 (27F), −78.5 (6F), −80.5 (6F), −91.0 to −88.5 (54F)

Table 1 shows the structures of $R^1$, $R^2$, $R^{3a}$, $R^{3b}$, $R^{3c}$, $R^{4a}$, $R^{4b}$, $R^5$, and $R^6$ when the compounds (A) to (V) of Examples 1 to 22 obtained in this manner are applied to Formula (1).

TABLE 1

| Compound | $R^1$ | $R^2$ | $R^{3a}$, $R^{3b}$, $R^{3c}$ | $R^{4a}$, $R^{4b}$ | $R^5$ | $R^6$ |
|---|---|---|---|---|---|---|
| (A) | (5-1) | (3-1) s = 1 | (4-1) | (3-1) s = 1 | (3-1) s = 1 | (5-1) |
| (B) | (5-1) | (3-1) s = 2 | (4-1) | (3-1) s = 1 | (3-1) s = 2 | (5-1) |
| (C) | (5-1) | (3-1) s = 3 | (4-1) | (3-1) s = 1 | (3-1) s = 3 | (5-1) |
| (D) | (5-2) | (3-1) s = 1 | (4-1) | (3-1) s = 1 | (3-1) s = 1 | (5-2) |
| (E) | (5-6) | (3-1) s = 1 | (4-1) | (3-1) s = 1 | (3-1) s = 1 | (5-6) |
| (F) | (5-7) | (3-1) s = 1 | (4-1) | (3-1) s = 1 | (3-1) s = 1 | (5-7) |
| (G) | (5-8) | (3-1) s = 1 | (4-1) | (3-1) s = 1 | (3-1) s = 1 | (5-8) |
| (H) | (5-1) | (3-2) t = 2 | (4-1) | (3-1) s = 1 | (3-2) t = 2 | (5-1) |
| (I) | (5-9) | (3-1) s = 1 | (4-1) | (3-1) s = 1 | (3-1) s = 1 | (5-9) |
| (J) | (5-10) | (3-1) s = 2 | (4-1) | (3-1) s = 1 | (3-1) s = 2 | (5-10) |
| (K) | (5-1) | (3-1) s = 1 | (4-1) | (3-1) s = 1 | (3-1) s = 2 | (5-1) |
| (L) | (5-1) | (3-1) s = 1 | (4-1) | (3-1) s = 1 | (3-1) s = 3 | (5-1) |
| (M) | (5-1) | (3-1) s = 2 | (4-1) | (3-1) s = 1 | (3-1) s = 3 | (5-1) |
| (N) | (5-1) | (3-1) s = 2 | (4-1) | (3-1) s = 1 | (3-1) s = 1 | (5-9) |

TABLE 1-continued

| Compound | $R^1$ | $R^2$ | $R^{3a}$, $R^{3b}$, $R^{3c}$ | $R^{4a}$, $R^{4b}$ | $R^5$ | $R^6$ |
|---|---|---|---|---|---|---|
| (O) | (5-1) | (3-1) s = 2 | (4-1) | (3-1) s = 1 | (3-1) s = 1 | 2-hydroxyethyl group |
| (P) | (5-1) | (3-1) s = 2 | (4-1) | (3-1) s = 1 | (3-1) s = 1 | allyl group |
| (Q) | (5-1) | (3-1) s = 2 | (4-1) | (3-1) s = 1 | (3-1) s = 1 | p-methoxyphenyl group |
| (R) | (5-1) | (3-1) s = 2 | (4-1) | (3-1) s = 1 | (3-2) t = 2 | hydrogen atom |
| (S) | (5-1) | (3-1) s = 2 | (4-2) | (3-1) s = 1 | (3-1) s = 2 | (5-1) |
| (T) | (5-1) | (3-1) s = 2 | (4-3) | (3-1) s = 1 | (3-1) s = 2 | (5-1) |
| (U) | (5-1) | (3-1) s = 2 | $R^{3a}/R^{3c}$ = (4-2) $R^{3b}$ = (4-1) | (3-1) s = 1 | (3-1) s = 2 | (5-1) |
| (V) | (5-1) | (3-1) s = 2 | (4-1) | (3-3) u = 2 | (3-1) s = 2 | (5-1) |

Comparative Example 11

The compound represented by the following Formula (X) was synthesized by the method described in Patent Document 5.

(X)

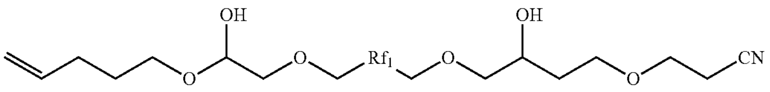

in Formula (X), $Rf_1$ is the PFPE chain represented by Formula (4-1); and in $Rf_1$, h indicating an average degree of polymerization represents 4.5, and i indicating an average degree of polymerization represents 4.5).

Comparative Example 2

The compound represented by the following Formula (Y) was synthesized by the method described in Patent Document 4.

(Y)

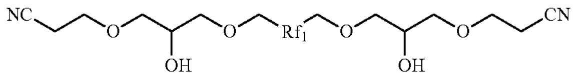

(in Formula (Y), $Rf_1$ is the PFPE chain represented by Formula (4-1); and in $Rf_1$, h indicating an average degree of polymerization represents 4.5, and i indicating an average degree of polymerization represents 4.5).

Comparative Example 3

The compound represented by the following Formula (Z) was synthesized by the method described in Patent Document 6.

(z)

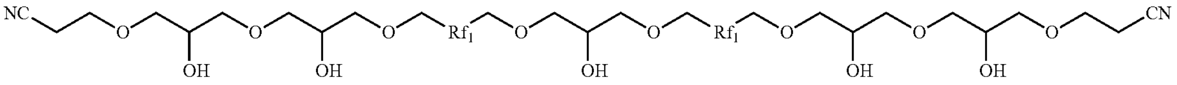

(in Formula (Z), $Rf_1$ is the PFPE chain represented by Formula (4-1); and in two $Rf_1$'s, h indicating an average degree of polymerization represents 4.5, and i indicating an average degree of polymerization represents 4.5).

Comparative Example 4

The compound represented by the following Formula (AA) was synthesized by the method described in Patent Document 6.

(AA)

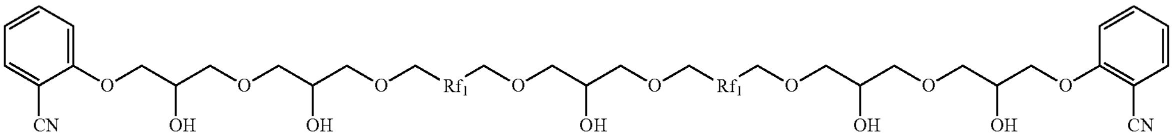

(in Formula (AA), $Rf_1$ is the PFPE chain represented by Formula (4-1); and in two $Rf_1$'s, h indicating an average degree of polymerization represents 4.5, and i indicating an average degree of polymerization represents 4.5).

Comparative Example 5

The compound represented by the following Formula (AB) was synthesized by the method described in Patent Document 1.

(AB)

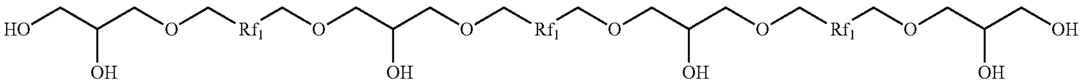

(in Formula (AB), $Rf_1$ is the PFPE chain represented by Formula (4-1); in the center $Rf_1$ among three $Rf_1$'s, h indicating an average degree of polymerization represents 2.0, and i indicating an average degree of polymerization represents 0; and in two $Rf_1$'s at both ends among three $Rf_1$'s, h indicating an average degree of polymerization represents 4.5, and i indicating an average degree of polymerization represents 4.5).

Comparative Example 61

The compound represented by the following Formula (AC) was synthesized by the method described in Patent Document 2.

(AC)

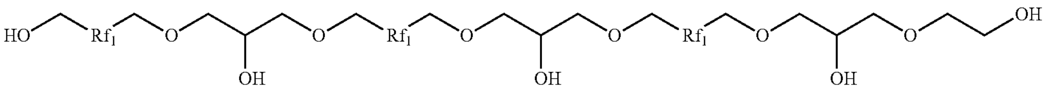

(in Formula (AC), $Rf_1$ is the PFPE chain represented by Formula (4-1); in the center $Rf_1$ among three $Rf_1$'s, h indicating an average degree of polymerization represents 2.0, and i indicating an average degree of polymerization represents 0; and in two $Rf_1$'s at both ends among three $Rf_1$'s, h indicating an average degree of polymerization represents 4.5, and i indicating an average degree of polymerization represents 4.5).

Comparative Example 71

The compound represented by the following Formula (AD) was synthesized by the method described in Patent Document 3.

(AD)

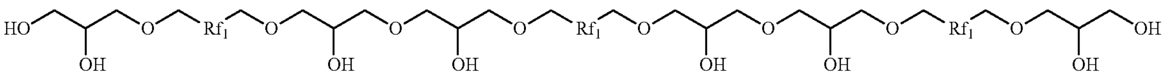

(in Formula (AD), $Rf_1$ is the PFPE chain represented by Formula (4-1); and in three $Rf_1$'s, h indicating an average degree of polymerization represents 7.0, and i indicating an average degree of polymerization represents 0).

The number-average molecular weight (Mn) of the compounds of Examples 1 to 22 and Comparative Examples 1 to 7 obtained in this manner was measured by the above method. The results are shown in Table 2 and Table 3.

Next, by the following method, a lubricating layer forming solution was prepared using the compounds obtained in Examples 1 to 22 and Comparative Examples 1 to 7. Then, using the obtained lubricating layer forming solution, by the following method, a lubricating layer of the magnetic recording medium was formed to obtain magnetic recording media of Examples 1 to 22 and Comparative Examples 1 to 7.

"Solution for Forming Lubricating Layer"

The compounds obtained in Examples 1 to 22 and Comparative Examples 1 to 7 were each dissolved in Vertrel (registered trademark) XF (product name, commercially available from Du Pont-Mitsui Fluorochemicals Co., Ltd.) as a fluorine solvent and diluted with Vertrel XF so that the film thickness when applied onto the protective layer was 9.0 Å to 9.5 Å, and thereby a lubricating layer forming solution was obtained.

"Magnetic Recording Medium"

A magnetic recording medium was prepared in which an adhesive layer, a soft magnetic layer, a first underlayer, a second underlayer, a magnetic layer, and a protective layer were sequentially provided on a substrate having a diameter of 65 mm. The protective layer was made of carbon.

The lubricating layer forming solution of Examples 1 to 22 and Comparative Examples 1 to 7 was applied onto the protective layer of the magnetic recording medium in which respective layers up to the protective layer were formed by a dipping method. Here, the dipping method was performed under conditions of an immersion speed of 10 mm/see, an immersion time of 30 sec, and a lifting speed of 1.2 mm/sec.

Then, the magnetic recording medium to which the lubricating layer forming solution was applied was put into a thermostatic chamber, a heat treatment which is performed for removing the solvent in the lubricating layer forming solution and improving the adhesion between the protective layer and the lubricating layer was performed at 120° C. for 10 minutes, and a lubricating layer was formed on the protective layer to obtain a magnetic recording medium.

(Film Thickness Measurement)

The film thickness of the lubricating layer of the magnetic recording media of Examples 1 to 22 and Comparative Examples 1 to 7 obtained in this manner was measured using FT-IR (product name: Nicolet iS50, commercially available from Thermo Fisher Scientific). The results are shown in Table 2 and Table 3.

Next, the magnetic recording media of Examples 1 to 22 and Comparative Examples 1 to 7 were subjected to the following floating stability test and corrosion resistance test.

(Floating Stability Test)

The following glide test and credence measurement were performed, and the floating stability was evaluated based on the following evaluation criteria. The results are shown in Table 2 and Table 3.

"Glide Test"

In the glide test, it was inspected whether there was any projection on the surface of the magnetic recording medium. That is, when a magnetic head was used to record and reproduce a magnetic recording medium, if there was a projection on the surface of the magnetic recording medium that had a height equal to or higher than the floating height (distance between the magnetic recording medium and the magnetic head), the magnetic head would sometimes collide with the projection, damaging the magnetic head, and causing defects in the magnetic recording medium. In the glide test, 50 magnetic recording media were inspected for whether there was a projection on the surface, which has a height equal to or higher than the floating height.

Specifically, when the distance between the inspection magnetic head and the magnetic recording medium was set to 0.25 microinches, the inspection magnetic head was moved over the magnetic recording medium, and a signal caused by a collision with the projection on the surface of the magnetic recording medium was output from the inspection magnetic head, the magnetic recording medium was determined to be defective, and otherwise was determined to be acceptable. Then, evaluation was performed using the number of magnetic recording media determined to be acceptable among the 50 magnetic recording media.

"Credence Measurement"

When the glide test was performed, noise temporarily increased, and a signal caused by a collision with a projection on the surface was sometimes detected or sometimes not even at the same location on the magnetic recording medium among a plurality of measurements. This phenomenon is called credence. The credence was not determined as a projection in the glide test, and was not used to determine whether the glide test was successful. However, a temporary increase in noise during the glide test generally indicates non-uniformity in the lubricant layer or the presence of relatively soft foreign matter. Therefore, the number of credences was counted when the glide test was performed on the magnetic recording media, and the credence average value was calculated by dividing the total number of detected credences by the number of magnetic recording media (50) on which the glide test was performed, and the obtained values were used as an index indicating the smoothness and cleanliness of the lubricant layer.

"Evaluation Criteria"

A: the number of media determined to be acceptable in the glide test was 45 or more and a credence average value was less than 0.5

B: the number of media determined to be acceptable in the glide test was 45 or more and a credence average value was 0.5 or more and less than 1.0

C: the number of media determined to be acceptable in the glide test was 45 or more and a credence average value was 1.0 or more and less than 5.0

D: the number of media determined to be acceptable in the glide test was less than 45, or a credence average value was 5.0 or more E: the number of media determined to be acceptable in the glide test was less than 45 and a credence average value was 5.0 or more (Corrosion Resistance Test)

The magnetic recording medium was exposed under conditions of a temperature of 85° C. and a relative humidity of 90% for 48 hours. Then, the number of corrosion spots with a diameter of 5 microns or more generated on the surface of the magnetic recording medium was counted using an optical surface analysis device (Candela7140, commercially available from KLA-Tencor), and evaluated based on the following evaluation criteria. The results are shown in Table 2 or Table 3.

"Evaluation Criteria"

A: less than 100 locations

B: 100 locations or more and less than 200 locations

C: 200 locations or more and less than 300 locations

D: 300 locations or more and less than 1,000 locations

E: 1,000 locations or more

TABLE 2

| | Compound | Molecular weight | Film thickness (Å) | Floating stability | Corrosion resistance |
|---|---|---|---|---|---|
| Example 1 | (A) | 3371 | 9.1 | B | B |
| Example 2 | (B) | 3482 | 9.3 | A | B |
| Example 3 | (C) | 3606 | 9.4 | A | C |
| Example 4 | (D) | 3401 | 9.2 | B | A |
| Example 5 | (E) | 3398 | 9.2 | C | A |
| Example 6 | (F) | 3465 | 9.1 | B | A |
| Example 7 | (G) | 3405 | 9.4 | B | B |
| Example 8 | (H) | 3388 | 9.3 | B | A |
| Example 9 | (I) | 3513 | 9.4 | C | A |
| Example 10 | (J) | 3608 | 9.4 | B | A |
| Example 11 | (K) | 3442 | 9.2 | B | B |
| Example 12 | (L) | 3505 | 9.3 | B | C |
| Example 13 | (M) | 3552 | 9.1 | A | C |
| Example 14 | (N) | 3530 | 9.4 | B | A |
| Example 15 | (O) | 3447 | 9.2 | B | B |

TABLE 2-continued

| | Compound | Molecular weight | Film thickness (Å) | Floating stability | Corrosion resistance |
|---|---|---|---|---|---|
| Example 16 | (P) | 3429 | 9.3 | B | A |
| Example 17 | (Q) | 3513 | 9.3 | B | A |
| Example 18 | (R) | 3425 | 9.1 | B | B |
| Example 19 | (S) | 3465 | 9.4 | A | B |
| Example 20 | (T) | 3473 | 9.2 | A | B |
| Example 21 | (U) | 3492 | 9.5 | A | B |
| Example 22 | (V) | 3501 | 9.3 | B | A |

TABLE 3

| | Compound | Molecular weight | Film thickness (Å) | Floating stability | Corrosion resistance |
|---|---|---|---|---|---|
| Comparative Example 1 | (X) | 1231 | 9.1 | D | E |
| Comparative Example 2 | (Y) | 1245 | 9.1 | D | E |
| Comparative Example 3 | (Z) | 2435 | 9.4 | D | D |
| Comparative Example 4 | (AA) | 2575 | 9.4 | D | C |
| Comparative Example 5 | (AB) | 3243 | 9.2 | D | D |
| Comparative Example 6 | (AC) | 3201 | 9.1 | E | D |
| Comparative Example 7 | (AD) | 3418 | 9.5 | C | D |

As shown in Table 2, the magnetic recording media of Examples 1 to 22 were evaluated as A to C in all evaluation items. Therefore, it was confirmed that, even if the lubricating layer of the magnetic recording media of Examples 1 to 22 was as thin as 9.5 Å or less, the floating stability of the magnetic head was favorable, and the effect of inhibiting corrosion of the magnetic recording medium was strong.

Particularly, as shown in Table 2, the lubricating layers of the magnetic recording media of Examples 2, 3, 13, and 19 to 21 using the compounds (B), (C), (M), and (S) to (U) had a floating stability evaluation of A, which was favorable.

It was thought that, in the compounds (C) and (M), since the total number of hydroxyl groups in the compound was 7 or more, and the adsorption force of the entire molecule was high, the adhesion was favorable and better floating stability was obtained.

In the compounds (B) and (S) to (U), since the total number of hydroxyl groups in the compound was 6, the adhesion to the protective layer was favorable. In addition, since $R^{3a}$ and $R^{3c}$ were the same, $R^{4a}$ and $R^{4b}$ were the same, and $R^1$—$R^2$— and $R^6$—$R^5$— were the same, the compound had a symmetrical structure centered on $R^{3b}$ in the molecule center, and it uniformly easily wet and spread on the protective layer. In addition, since $R^{4a}$ and $R^{4b}$ were a linking group represented by Formula (3-1) and s was 1, and the cyano group in $R^1$ and $R^6$ was bonded to a linear alkyl group, the adsorption force with respect to the protective layer was high. Accordingly, it was thought that better floating stability was obtained in Examples 2, and 19 to 21.

Comparing Examples 1, and 4 to 9 which use the compounds (A) and (D) to (I) with a total number of 4 hydroxyl groups, favorable floating stability was obtained in Examples 1, 4, and 6 to 8. In the compounds (A), (D), and (F) to (H) used in these examples, $R^1$ and $R^6$ had any of the structures (5-1) and (5-2) in which the cyano group was bonded to a linear alkyl group, the structure (5-7) having two cyano groups, and the structure (5-8) having a carbonyl group which is a polar moiety, in addition to the cyano group. It was speculated that the cyano group thereof easily approached the protective layer and had a high ability to interact with the active sites on the protective layer, compared with compounds (E) and (I) in which $R^1$ and $R^6$ had structures (5-6) and (5-9) in which a cyano group was bonded to a relatively bulky hydrocarbon group. Accordingly, it was thought that, when the compounds (A), (D), and (F) to (H) were used, excellent floating stability was obtained.

In addition, as shown in Table 2, the lubricating layers of the magnetic recording media of Examples 4 to 6, 8 to 10, 14, 16, 17, and 22 using the compounds (D) to (F), (H) to (J), (N), (P), (Q), and (V) had a corrosion resistance evaluation of A, which was favorable.

$R^1$ and/or $R^6$ in the compounds (D) to (F), (I), (J), and (N) were the end groups (5-2), (5-6), (5-7), (5-9), and (5-10) in which a cyano group was bonded to a hydrocarbon group having 3 or more carbon atoms. In addition, in the compound (H), $R^2$ and $R^5$ had the structure (3-2) in which one methylene group was added to a glycerin framework, and in the compound (V), $R^{4a}$ and $R^{4b}$ had the structure (3-3) in which one methylene group was added to a glycerin framework. In addition, in the compounds (P) and (Q), the end group having a cyano group was only $R^1$, and $R^6$ was a group having a double bond. Accordingly, the lubricating layers containing the compounds (D) to (F), (H) to (J), (N), (P), (Q), and (V) had favorable hydrophobicity, and effectively prevented intrusion of water, which causes corrosion of the magnetic recording medium. Therefore, it was speculated that, in Examples 4 to 6, 8 to 10, 14, 16, 17, and 22 using these compounds, the hydrophilicity was low and favorable corrosion resistance was obtained, as compared with Examples 3, 12, and 13 using the compounds (C), (L) and (M) in which $R^2$ and/or $R^5$ had three hydroxyl groups.

In addition, as shown in Table 3, both Comparative Examples 1 and 2 using the compounds (X) and (Y) in which a perfluoropolyether chain was provided in the center of the molecule and an organic group having a cyano group and a hydroxyl group was bonded to one side or both sides thereof had a floating stability evaluation of D and a corrosion resistance evaluation of E.

In Comparative Examples 1 and 2, the compounds (X) and (Y) in which only one perfluoropolyether chain was disposed in the molecule center part, and there was no perfluoropolyether chain bonded via a linking group having a polar group were used. Therefore, the adhesion between the lubricating layer and the protective layer was insufficient, the lubricant was likely to aggregate and form projections, and water was likely to enter the lubricating layer. Accordingly, it was speculated that the magnetic recording media of Comparative Examples 1 and 2 had poor floating stability and corrosion resistance results.

In addition, in Comparative Examples 3 and 4, the compounds (Z) and (AA) were used in which a glycerin structure was provided in the center of the chain structure, and a perfluoropolyether chain and an organic group having a cyano group and a hydroxyl group were bonded in that order to both sides. All of the magnetic recording media of Comparative Examples 3 and 4 had a floating stability evaluation of D, and Comparative Example 3 had a corrosion resistance evaluation of D and Comparative Example 4 had a corrosion resistance evaluation of C. It was speculated that, in Comparative Examples 3 and 4, since the compound (Z) or compound (AA) in which the number of perfluoropolyether chains bonded via a linking group having a polar group was 2 was used, the lubricant could not sufficiently interact with the protective layer, the adhesion between the lubricating layer and the protective layer was insufficient, and the floating stability and corrosion resistance results were poor.

In addition, in Comparative Examples 5 and 6, the compounds (AB) and (AC) which had a framework formed of three perfluoropolyether chains linked via a glycerin structure and end groups having one or two hydroxyl groups bonded to both ends thereof were used. The magnetic recording medium of Comparative Example 5 had a floating stability evaluation of D and a corrosion resistance evaluation of D. In addition, the magnetic recording medium of Comparative Example 6 had a floating stability evaluation of E and a corrosion resistance evaluation of D.

In addition, in Comparative Example 7, the compound (AD) which had a framework formed of three perfluoropolyether chains linked via a linking group having two hydroxyl groups and end groups having two hydroxyl groups bonded to both ends thereof was used. The magnetic recording medium of Comparative Example 7 had a floating stability evaluation of C and a corrosion resistance evaluation of D.

The compounds (AB) to (AD) used in Comparative Examples 5 to 7 had only hydroxyl groups as polar groups at both ends of the molecule. Therefore, in the magnetic recording media of Comparative Examples 5 to 7, the polar groups in the lubricant easily interacted with each other and easily aggregated, in comparison with the magnetic recording media of Examples 1 to 22 containing the compounds (A) to (V) in which $R^1—R^2—$ and/or $R^6—R^5—$ had a hydroxyl group and a cyano group. As a result, it was speculated that, in the lubricating layer containing the compounds (AB) to (AD), projections formed by aggregation of molecules were likely to be formed, and floating stability was insufficient.

In addition, the plurality of polar groups contained in the compounds (AB) to (AD) inhibited each other's interaction with the protective layer. Therefore, it was speculated that there were many polar groups that were not adsorbed to the protective layer in the lubricating layers of the magnetic recording media of Comparative Examples 5 to 7. In addition, since the compounds (AB) to (AD) contained no cyano group, the positively charged sites on the protective layer were not easily covered with the lubricating layer, and were easily exposed on the surface of the magnetic recording medium. The positively charged sites on the protective layer exposed on the surface of the magnetic recording medium tended to absorb water. Accordingly, it was speculated that, in the lubricating layers of the magnetic recording media of Comparative Examples 5 to 7, the polar groups that were not adsorbed to the protective layer, and the positively charged sites exposed on the protective layer tended to absorb water and the corrosion resistance result was poor.

INDUSTRIAL APPLICABILITY

When the lubricant for a magnetic recording medium containing the fluorine-containing ether compound of the present invention is used, it is possible to form a lubricating layer that improves floating stability of a magnetic head and that has a strong effect of inhibiting corrosion of the magnetic recording medium even if the thickness is thin.

REFERENCE SIGNS LIST

10 Magnetic recording medium
11 Substrate

12 Adhesive layer
13 Soft magnetic layer
14 First underlayer
15 Second underlayer
16 Magnetic layer
17 Protective layer
18 Lubricating layer

The invention claimed is:

1. A fluorine-containing ether compound represented by Formula (1) shown below:

$$R^1—R^2—CH_2—R^{3a}—CH_2—R^{4a}—CH_2—R^{3b}—CH_2—R^{4b}—CH_2—R^{3c}—CH_2—R^5—R^6 \quad (1)$$

(in Formula (1), $R^{3a}$, $R^{3b}$, and $R^{3c}$ are perfluoropolyether chains; some or all of $R^{3a}$, $R^{3b}$, and $R^{3c}$ may be the same or all of them may be different from each other; $R^2$, $R^{4a}$, $R^{4b}$, and $R^5$ are divalent linking groups having at least one polar group selected from the group consisting of a hydroxyl group, an amino group, a carboxy group, and a sulfo group; some or all of $R^2$, $R^{4a}$, $R^{4b}$, and $R^5$ may be the same or all of them may be different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom located at an end of $R^2$ or $R^5$, and may be the same as or different from each other; and $R^1$ and $R^6$ are an organic group having 1 to 50 carbon atoms or a hydrogen atom, and at least one of them is a group in which a cyano group is bonded to a carbon atom of an organic group having 1 to 8 carbon atoms).

2. The fluorine-containing ether compound according to claim 1, wherein, in Formula (1), at least one of $R^1$ and $R^6$ is a group in which a cyano group is bonded to a carbon atom constituting a phenyl group or an alkyl group having 1 to 6 carbon atoms.

3. The fluorine-containing ether compound according to claim 1, wherein, in Formula (1), $R^2$, $R^{4a}$, $R^{4b}$, and $R^5$ each have one or more hydroxyl groups.

4. The fluorine-containing ether compound according to claim 3, wherein a total number of hydroxyl groups in $R^2$ and hydroxyl groups in $R^5$ in Formula (1) is 2 to 6.

5. The fluorine-containing ether compound according to claim 1, wherein, in Formula (1), both $R^1$ and $R^6$ are a group in which a cyano group is bonded to a carbon atom constituting a phenyl group or an alkyl group having 1 to 6 carbon atoms.

6. The fluorine-containing ether compound according to claim 1, wherein, in Formula (1), $R^2$, $R^{4a}$, $R^{4b}$, and $R^5$ are each independently a linking group represented by Formula (2) shown below:

(2)

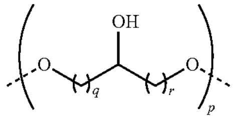

(in Formula (2), p represents an integer of 1 to 3; represents an integer of 1 to 4, and r represents an integer of 1 to 4; an oxygen atom on the leftmost side in Formula (2) is disposed on the side opposite to $R^{3b}$ in Formula (1); and an oxygen atom on the rightmost side in Formula (2) is disposed on the side of $R^{3b}$ in Formula (1)).

7. The fluorine-containing ether compound according to claim 1, wherein, in Formula (1), $R^2$ and $R^5$ are each independently a linking group represented by Formula (3-1) or (3-2) shown below:

(3-1)

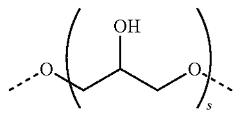

(3-2)

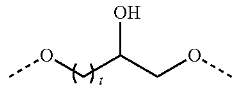

(in Formula (3-1), s represents an integer of 1 to 3; and in Formula (3-1), an oxygen atom on the leftmost side is bonded to $R^1$ or $R^6$, and an oxygen atom on the rightmost side is bonded to $CH_2$ adjacent to $R^{3a}$ or $R^{3c}$)

(in Formula (3-2), t represents an integer of 2 to 4; and in Formula (3-2), an oxygen atom on the left side is bonded to $R^1$ or $R^6$, and an oxygen atom on the right side is bonded to $CH_2$ adjacent to $R^{3a}$ or $R^{3c}$).

8. The fluorine-containing ether compound according to claim 1, wherein, in Formula (1), $R^{4a}$ and $R^{4b}$ are each independently a linking group represented by Formula (3-1) or (3-3) shown below:

(3-1)

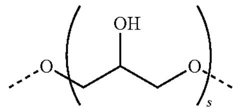

(3-3)

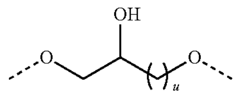

(in Formula (3-1), s represents an integer of 1 to 3; and in Formula (3-1), an oxygen atom on the leftmost side is bonded to $CH_2$ adjacent to $R^{3a}$ or $R^{3c}$, and an oxygen atom on the rightmost side is bonded to $CH_2$ adjacent to $R^{3b}$)

(in Formula (3-3), u represents an integer of 2 to 4; and in Formula (3-3), an oxygen atom on the left side is bonded to $CH_2$ adjacent to $R^{3a}$ or $R^{3c}$, and an oxygen atom on the right side is bonded to $CH_2$ adjacent to $R^{3b}$).

9. The fluorine-containing ether compound according to claim 1, wherein, in Formula (1), $R^{3a}$ and $R^{3c}$ are the same, $R^{4a}$ and $R^{4b}$ are the same, and $R^1—R^2—$ and $R^6—R^5—$ are the same.

10. The fluorine-containing ether compound according to claim 1, wherein, in Formula (1), $R^{3a}$, $R^{3b}$, and $R^{3c}$ are each independently a perfluoropolyether chain represented by Formula (4) shown below:

$$—(CF_2)_{w1}—O—(CF_2O)_{w2}—(CF_2CF_2O)_{w3}—(CF_2CF_2CF_2O)_{w4}—(CF_2CF_2CF_2CF_2O)_{w5}—(CF_2)_{w6}— \quad (4)$$

(in Formula (4), w2, w3, w4, and w5 indicate an average degree of polymerization, and each independently represent 0 to 20, provided that all of w2, w3, w4, and w5 are not 0 at the same time; w1 and w6 are average values indicating the number of $CF_2$'s, and each independently represent 1 to 3; and the arrangement sequence of repeating units in Formula (4) is not particularly limited).

11. The fluorine-containing ether compound according to claim 1, wherein, in Formula (1), $R^{3a}$, $R^{3b}$, and $R^{3c}$ are each independently any one selected from among perfluoropolyether chains represented by Formulae (4-1) to (4-4) shown below:

$$—CF_2—(OCF_2CF_2)_h—(OCF_2)_i—OCF_2— \quad (4\text{-}1)$$

(in Formula (4-1), h and i indicate an average degree of polymerization, h represents 1 to 20, and i represents 0 to 20)

$$—CF_2CF_2—(OCF_2CF_2CF_2)_j—OCF_2CF_2— \quad (4\text{-}2)$$

(in Formula (4-2), j indicates an average degree of polymerization, and represents 1 to 15)

$$—CF_2CF_2CF_2—(OCF_2CF_2CF_2CF_2)_k—OCF_2CF_2CF_2— \quad (4\text{-}3)$$

(in Formula (4-3), k indicates an average degree of polymerization, and represents 1 to 10)

$$—(CF_2)_{w7}—O—(CF_2CF_2CF_2O)_{w8}—(CF_2CF_2O)_{w9}—(CF_2)_{w10}— \quad (4\text{-}4)$$

(in Formula (4-4), w8 and w9 indicate an average degree of polymerization, and each independently represent 1 to 20; and w7 and w10 are average values indicating the number of $CF_2$'s, and each independently represent 1 to 2).

12. The fluorine-containing ether compound according to claim 1, which has a number-average molecular weight in a range of 400 to 10,000.

13. A lubricant for a magnetic recording medium comprising the fluorine-containing ether compound according to claim 1.

14. A magnetic recording medium in which at least a magnetic layer, a protective layer, and a lubricating layer are sequentially provided on a substrate, wherein the lubricating layer contains the fluorine-containing ether compound according to claim 1.

15. The magnetic recording medium according to claim 14, wherein the lubricating layer has an average film thickness of 0.5 nm to 2.0 nm.

* * * * *